United States Patent
Rudolf et al.

(10) Patent No.: US 12,335,972 B2
(45) Date of Patent: Jun. 17, 2025

(54) 5G NR DATA DELIVERY FOR FLEXIBLE RADIO SERVICES

(71) Applicant: InterDigital Patent Holdings, Inc., Wilmington, DE (US)

(72) Inventors: Marian Rudolf, Montreal (CA); Paul Marinier, Brossard (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/136,482

(22) Filed: Apr. 19, 2023

(65) Prior Publication Data

US 2023/0262717 A1   Aug. 17, 2023

Related U.S. Application Data

(63) Continuation of application No. 16/336,654, filed as application No. PCT/US2017/053646 on Sep. 27, 2017, now Pat. No. 11,671,973.
(Continued)

(51) Int. Cl.
*H04W 72/23* (2023.01)
*H04L 1/1607* (2023.01)
(Continued)

(52) U.S. Cl.
CPC .......... *H04W 72/23* (2023.01); *H04L 1/1614* (2013.01); *H04L 5/0094* (2013.01); *H04W 72/569* (2023.01); *H04W 72/1273* (2013.01)

(58) Field of Classification Search
CPC ............ H04W 28/26; H04W 72/0446; H04W 72/0453; H04W 72/046; H04W 72/23;
(Continued)

(56) References Cited

U.S. PATENT DOCUMENTS

| | | | |
|---|---|---|---|
| 8,873,489 B2 | 10/2014 | Liao et al. | |
| 9,949,261 B2 | 4/2018 | Chen et al. | |

(Continued)

FOREIGN PATENT DOCUMENTS

| | | | |
|---|---|---|---|
| CN | 101715237 A | 5/2010 | |
| CN | 102577571 A | 7/2012 | |

(Continued)

OTHER PUBLICATIONS

Li et al., "Data Transmission Method and Apparatus", Oct. 5, 2017, WO, English translation of WO 2017166217. (Year: 2017).*
(Continued)

*Primary Examiner* — Michael K Phillips
(74) *Attorney, Agent, or Firm* — Flaster Greenberg, P.C.

(57) ABSTRACT

Embodiments include methods, systems, and apparatuses for receiving a first type of transmission and a second type of transmission. A WTRU may receive a first downlink control information (DCI) during a first downlink (DL) transmission interval allocating first radio resources in the first DL transmission interval for reception of a first type of transmission. The WTRU may receive data from the first type of transmission in the first radio resources. The WTRU may receive data from a second type of transmission in second radio resources that include one or more predetermined regions within the first radio resources. The WTRU may receive a second DCI during a subsequent second DL transmission interval indicating that the data from the first type of transmission was preempted by the data from the second type of transmission. The WTRU may process the data from the first type of transmission based on the second DCI.

21 Claims, 15 Drawing Sheets

Related U.S. Application Data

(60) Provisional application No. 62/500,803, filed on May 3, 2017, provisional application No. 62/431,799, filed on Dec. 8, 2016, provisional application No. 62/416,608, filed on Nov. 2, 2016, provisional application No. 62/400,989, filed on Sep. 28, 2016.

(51) Int. Cl.
 *H04L 5/00* (2006.01)
 *H04W 72/566* (2023.01)
 *H04W 72/1273* (2023.01)

(58) Field of Classification Search
 CPC . H04W 74/04; H04W 74/0833; H04W 80/08; H04W 88/023; H04W 88/10; H04W 74/002; H04W 72/20; H04W 72/569; H04W 72/1273; H04W 72/232; H04W 84/12; H04L 5/1469; H04L 5/0044; H04L 5/0053; H04L 1/1614; H04L 5/0094; H04L 1/1812; H04L 1/16; H04L 1/1835; H04B 7/0617; H04B 7/0695
 See application file for complete search history.

(56) References Cited

U.S. PATENT DOCUMENTS

| | | | |
|---|---|---|---|
| 10,230,480 B2 | 3/2019 | Li et al. | |
| 10,555,294 B2 | 2/2020 | Kim et al. | |
| 10,834,631 B2 | 11/2020 | Kim et al. | |
| 11,218,271 B2 | 1/2022 | Xiong et al. | |
| 11,671,973 B2 * | 6/2023 | Rudolf | H04L 5/0094 |
| | | | 370/329 |
| 11,770,220 B2 | 9/2023 | Bala et al. | |
| 11,848,783 B2 * | 12/2023 | Kini | H04L 1/1607 |
| 2008/0192847 A1 | 8/2008 | Classon et al. | |
| 2011/0255485 A1 | 10/2011 | Chen et al. | |
| 2013/0051354 A1 | 2/2013 | Ling | |
| 2014/0126490 A1 * | 5/2014 | Chen | H04L 5/0035 |
| | | | 370/328 |
| 2015/0085717 A1 | 3/2015 | Papasakellariou et al. | |
| 2015/0131579 A1 | 5/2015 | Li et al. | |
| 2015/0230211 A1 | 8/2015 | You et al. | |
| 2015/0271814 A1 | 9/2015 | Park et al. | |
| 2016/0205664 A1 | 7/2016 | Zhang et al. | |
| 2016/0227560 A1 | 8/2016 | Webb et al. | |
| 2016/0234857 A1 | 8/2016 | Chen et al. | |
| 2016/0323850 A1 | 11/2016 | Papasakellariou et al. | |
| 2017/0085326 A1 | 3/2017 | Li et al. | |
| 2017/0310431 A1 * | 10/2017 | Iyer | H04W 72/23 |
| 2017/0353963 A1 | 12/2017 | Hong et al. | |
| 2017/0359897 A1 | 12/2017 | Pueschner et al. | |
| 2017/0367046 A1 | 12/2017 | Papasakellariou | |
| 2018/0027576 A1 | 1/2018 | Kowalski et al. | |
| 2018/0035332 A1 | 2/2018 | Agiwal et al. | |
| 2018/0041325 A1 | 2/2018 | Lee et al. | |
| 2018/0063749 A1 | 3/2018 | Islam et al. | |
| 2018/0063865 A1 | 3/2018 | Islam et al. | |
| 2018/0070341 A1 | 3/2018 | Islam et al. | |
| 2018/0115964 A1 | 4/2018 | Lin et al. | |
| 2018/0227958 A1 | 8/2018 | Xiong et al. | |
| 2018/0248597 A1 | 8/2018 | Jiang et al. | |
| 2018/0270022 A1 | 9/2018 | Sun et al. | |
| 2018/0278454 A1 | 9/2018 | Islam et al. | |
| 2018/0287745 A1 | 10/2018 | Sun et al. | |
| 2018/0359745 A1 | 12/2018 | Yeo et al. | |
| 2019/0044601 A1 | 2/2019 | Chang et al. | |
| 2019/0098608 A1 | 3/2019 | Yi et al. | |
| 2019/0132823 A1 | 5/2019 | Sano et al. | |
| 2019/0165882 A1 | 5/2019 | You et al. | |
| 2019/0165894 A1 * | 5/2019 | Choi | H04W 72/1273 |
| 2019/0229840 A1 | 7/2019 | Takeda et al. | |
| 2019/0260519 A1 | 8/2019 | Du et al. | |
| 2019/0268096 A1 | 8/2019 | Takeda et al. | |
| 2019/0289614 A1 | 9/2019 | Li et al. | |
| 2019/0320450 A1 | 10/2019 | Li et al. | |
| 2019/0327038 A1 | 10/2019 | Du et al. | |
| 2019/0327723 A1 | 10/2019 | Li et al. | |
| 2019/0327751 A1 | 10/2019 | Dong et al. | |
| 2019/0349174 A1 | 11/2019 | Guan | |
| 2019/0349914 A1 | 11/2019 | Xu et al. | |
| 2019/0356415 A1 | 11/2019 | Peng et al. | |
| 2019/0364563 A1 | 11/2019 | Jung et al. | |
| 2019/0387538 A1 | 12/2019 | Du et al. | |
| 2020/0022160 A1 | 1/2020 | Zou et al. | |
| 2020/0044776 A1 | 2/2020 | Guan et al. | |
| 2020/0053698 A1 | 2/2020 | Chen et al. | |
| 2020/0076484 A1 | 3/2020 | Noh et al. | |
| 2020/0077470 A1 | 3/2020 | Xiong et al. | |
| 2020/0099399 A1 | 3/2020 | Xie et al. | |
| 2020/0214020 A1 | 7/2020 | Hong et al. | |
| 2020/0228239 A1 | 7/2020 | Wang et al. | |
| 2020/0235752 A1 | 7/2020 | Sandberg et al. | |
| 2020/0235759 A1 | 7/2020 | Ye et al. | |
| 2020/0351876 A1 | 11/2020 | Hong et al. | |
| 2020/0358557 A1 | 11/2020 | Park et al. | |
| 2021/0135791 A1 | 5/2021 | Wang et al. | |
| 2021/0321270 A1 | 10/2021 | Li et al. | |

FOREIGN PATENT DOCUMENTS

| | | | |
|---|---|---|---|
| CN | 105101283 A | 11/2015 | |
| CN | 102893684 B | 9/2016 | |
| CN | 105979597 A | 9/2016 | |
| CN | 106455103 A | 2/2017 | |
| CN | 108270539 A | 7/2018 | |
| EP | 2557879 A1 | 2/2013 | |
| JP | 2018511203 A | 4/2018 | |
| WO | 2017059829 A1 | 4/2017 | |
| WO | WO 2017/099834 A1 | 6/2017 | |
| WO | WO-2017166217 A1 * | 10/2017 | |
| WO | WO 2016/126398 A1 | 8/2018 | |

OTHER PUBLICATIONS

3GPP TSG RAN WG1 #86, "PUSCH resource allocation method", Intel Corporation, R1-166504, Gothenburg, Sweden (Aug. 22-26, 2016).

CN 101715237 A, Previously cited Information Disclosure Statement dated Feb. 7, 2022, in related U.S. Appl. No. 16/336,654 English Abstract previously provided by Espacenet.com.

R1-167708, "Discussion on multiplexing of eMBB and URLLC", 3GPP TSG RAN1 WG Meeting #86, Gothenburg, Sweden, Aug. 22-26, 2016, 5 Pages.

3rd Generation Partnership Project (3GPP); "CSI-RS Overhead Reduction for Beamformed CSI-RS Transmission Schemes", Nokia, Alcatel-Lucent Shanghai Bell, 3GPP TSG RAN WG1, Meeting #85, R1-164336, Nanjing, China, May 23-27, 2016, 3 pages.

3rd Generation Partnership Project (3GPP), "Discussion on efficient utilization of BF CSI-RS", Huawei, HiSilicon, 3GPP TSG RAN WG1, Meeting #85, R1-164858, Nanjing, China, May 23-27, 2016, 4 pages.

3rd Generation Partnership Project (3GPP), "Channel coding schemes for eMBB and URLLC Coexistence", Sharp, MTI, 3GPP TSG RAN WG1, Meeting # 86, R1-167617, Gothenburg, Sweden, Aug. 22-26, 2016, 10 pages.

National Intellectual Property Administration of the People's Republic of China (CNIPA), "First Notification of Office Action", Oct. 25, 2021, Application No. 201780059298.5, 9 pages.

3GPP, 3rd Generation Partnership Project; Technical Specification Group Radio Access Network; Evolved Universal Terrestrial Radio Access (E-UTRA); Radio Resource Control (RRC); Protocol specification (Release 11), Jun. 2016, 3GPP, 3GPP TS 36.331 V11.16.0 (Year: 2016).

InterDigital, "Short-TTI PDSCH Design," 3GPP TSG RAN WG1 Meeting #84bis, R1-162964, Busan, Korea (Apr. 11-15, 2016).

Third Generation Partnership Project, "Technical Specification Group Radio Access Network; NR; Physical layer procedures for data (Release 15)," 3GPP TS 38.214 V0.0.1 (Jul. 2017). (This reference can be found 3ri the 3GPP website as V0.0.2).

(56) References Cited

OTHER PUBLICATIONS

InterDigital Communications, "Downlink scheduling using slots and mini-slots," 3GPP TSG-RAN WG1 Meeting #87, R1-1612314, Reno, USA (Nov. 14-18, 2016).
InterDigital Communications, "Downlink scheduling using slots and mini-slots," 3GPP TSG RAN WG1 AH_NR Meeting, R1-1700858, Spokane, USA (Jan. 16-20, 2017).
InterDigital Communications, "Efficient multiplexing of traffic for different use cases," 3GPP TSG-RAN WG1 Meeting #86, R1-167331, Gothenburg, Sweden (Aug. 22-26, 2016).
InterDigital Communications, "Scheduling and support for service multiplexing," 3GPP TSG-RAN WG1 Meeting #86bis, R1-1610090, Lisbon, Portugal (Oct. 10-14, 2016).
InterDigital Communications, "Scheduling and support for service multiplexing," 3GPP TSG-RAN WG1 Meeting #87, R1-1612316, Reno, USA (Nov. 14-18, 2016).
InterDigital Communications, "Scheduling-based URLLC and eMBB multiplexing," 3GPP TSG-RAN WG1 AH_NR Meeting, R1-1700722, Spokane, USA (Jan. 16-20, 2017).
Mediatek Inc., "DCI-light/free URLLC Transmission in DL," 3GPP TSG RAN WG1 Meeting #88, R1-1702726, Athens, Greece (Feb. 13-17, 2017).
Nokia et al., "Punctured Scheduling for Low Latency Transmissions," 3GPP TSG-RAN WG1 #85, R1-165381, Nanjing, P.R. China (May 23-27, 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).
Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).
Third Generation Partnership Project, "Technical Specification Group Radio Access Network; Evolved Universal Terrestrial Radio Access (E-UTRA) and Evolved Universal Terrestrial Radio Access Network (EUTRAN); Overall description; Stage 2 (Release 13)," 3GPP TS 36.300 V13.9.0 (Sep. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.4.0 (Sep. 2017).
Third Generation Partnership Project, "Technical Specification Group Radio Access Network; Evolved Universal Terrestrial Radio Access (E-UTRA); Physical layer; Measurements (Release 13)," 3GPP TS 36.214 V13.2.0 (Jun. 2016).
Third Generation Partnership Project, "Technical Specification Group Radio Access Network; Evolved Universal Terrestrial Radio Access (E-UTRA); Physical layer; Measurements (Release 13)," 3GPP TS 36.214 V13.5.0 (Sep. 2017).
Third Generation Partnership Project, "Technical Specification Group Radio Access Network; Evolved Universal Terrestrial Radio Access (E-UTRA); Physical layer; Measurements (Release 14)," 3GPP TS 36.214 V14.3.0 (Sep. 2017).
Third Generation Partnership Project, "Technical Specification Group Radio Access Network; Evolved Universal Terrestrial Radio Access (E-UTRA); Physical layer; Measurements (Release 15)," 3GPP TS 36.214 V15.0.0 (Sep. 2017).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.6.0 (Jun. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.4.0 (Sep. 2017).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.7.0 (Sep. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.4.0 (Sep. 2017).
Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.7.0 (Sep. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; NR; Multiplexing and channel coding (Release 15)," 3GPP TS 38.212 V0.1.0 (Aug. 2017).
Third Generation Partnership Project, "Technical Specification Group Radio Access Network; NR; Multiplexing and channel coding (Release 15)," 3GPP TS 38.214 V0.0.1 (Jul. 2017).
Third Generation Partnership Project, "Technical Specification Group Radio Access Network; NR; Radio Resource Control (RRC); Protocol specification (Release 15)," 3GPP TS 38.331 V0.0.5 (Aug. 2017).
Third Generation Partnership Project, "Technical Specification Group Radio Access Network; NR; Physical layer procedures for control (Release 15)," 3GPP TS 38.213 V1.0.0 (Sep. 2017).
Intel Corporation, "Frame structure considerations for URLLC," 3GPP TSG RAN WG1 Meeting #86, R1-167127, Gothenburg, Sweden (Aug. 22-26, 2016).
LG Electronics, "Handling URLLC in new RAT," 3GPP TSG RAN WG1 Meeting #86, R1-166886, Gothenburg, Sweden (Aug. 22-26, 2016).
Nokia et al., Punctured Scheduling for Low Latency Transmissions,"3GPP TSG-RAN WG1 #86, R1-167308," Gothenburg, Sweden (Aug. 22-26, 2016).
ZTE et al., "Multiplexing of eMBB and URLLC," 3GPP TSG RAN WG1 Meeting #86, R1-166408, Gothenburg, Sweden (Aug. 22-26, 2016).
Third Generation Partnership Project (3GPP), "Overall Discussion on URLLC", LG Electronics, 3GPP TSG RAN WG1 Meeting #86, Aug. 22-26, 2016, R1-166882, 5 pages.
Third Generation Partnership Project (3GPP), "Semi-Persistent Scheduling for 5G New Radio URLLC", Nokia, Alcatel-Lucent Shanghai Bell, 3GPP TSG-RAN WG1 #86, Aug. 22-26, 2016, R1-167309, 6 pages.
Third Generation Partnership Project (3GPP), "On Co-Existence of eMBB and URLLC", NTT DOCOMO, Inc., 3GPP TSG RAN WG1 Meeting #86, Aug. 22-26, 2016, R1-167391, 5 pages.
Third Generation Partnership Project (3GPP), "WF on Supporting URLLC in NR", LG Electronics, ZTE, 3GPP TSG RAN WG1 Meeting #86, Gothenburg, Sweden, Aug. 22-26, 2016, R1-168438, 2 pages.
Third Generation Partnership Project (3GPP), "UE Support for Multiple Numerologies with NR", InterDigital Communications, 3GPP TSG-RAN WG2 #95, Gothenburg, Sweden Aug. 22-26, 2016, R2-165055, 3 pages.

(56) References Cited

OTHER PUBLICATIONS

Third Generation Partnership Project (3GPP), "Consideration on Grant Free Transmission for NR", Huawei, HiSilicon, 3GPP TSG-RAN WG2 Meeting #95, Gothenburg, Sweden, Aug. 22-26, 2016, R2-165442, 3 pages.

Third Generation Partnership Project (3GPP), "On DL Multiplexing of URLLC and eMBB Transmissions", Huawei, HiSilicon, 3GPP TSG RAN WG1 Meeting #88, Athens, Greece, Feb. 13-17, 2017, R1-1701663, 10 pages.

Third Generation Partnership Project (3GPP), "On DL Multiplexing of URLLC and eMBB Transmissions", Huawei, HiSilicon, 3GPP TSG RAN WG1 Meeting #88bis, Spokane, USA, Apr. 3-7, 2017, R1-1704216, 8 pages.

Third Generation Partnership Project (3GPP), "On Pre-Emption Indication for DL Multiplexing of URLLC and eMBB", Huawei, HiSilicon, 3GPP TSG RAN WG1 Meeting #88bis, Spokane, USA, Apr. 3-7, 2017, R1-1704215, 5 pages.

Third Generation Partnership Project (3GPP), "On Indication for Downlink Punctured / Preemptive Scheduling", Nokia, Alcatel-Lucent Shanghai Bell, 3GPP TSG-RAN WG1 #88-BIS, Spokane, WA, United States, Apr. 3-7, 2017, R1-1705247, 4 pages.

Third Generation Partnership Project (3GPP), "DL HARQ Considerations for URLLC and Punctured eMBB", Ericsson, 3GPP TSG-RAN WG2 Meeting #97bis, Spokane, USA, Apr. 3-7, 2017, Tdoc R2-1702664, 4 pages.

International Search Report and Written Opinion mailed on Jul. 12, 2018 for PCT/EP2018/061197 filed on May 2, 2018, 15 pages.

11 5gmf, "5G Radio Access Technologies", Jul. 5, 2016, XP055384668, Retrieved from the Internet URL:http://5gmf.jp/wp/wp-content/uploads/2016/07/SGMF_WPIOO_ 11_5G_RAT_pdf on Jun. 23, 2017, pp. 104-129.

Ji et al. "Introduction to Ultra Reliable and Low Latency Communications in 5G", arXiv.org, 20170419 Cornell University Library, 201 Olin Library Cornell University Ithaca, NY 14853, Apr. 19, 2017, 15 pages.

* cited by examiner

5G NR DATA DELIVERY FOR FLEXIBLE RADIO SERVICES

CROSS REFERENCE TO RELATED APPLICATIONS

This application is a continuation of U.S. Non-Provisional application Ser. No. 16/336,654, filed Mar. 26, 2019, which is a National Stage Application of PCT/US2017/053646, filed on Sep. 27, 2017, which claims the benefit of U.S. Provisional Application No. 62/500,803, filed May 3, 2017, U.S. Provisional Application No. 62/431,799, filed Dec. 8, 2016, U.S. Provisional Application No. 62/416,608, filed Nov. 2, 2016, and U.S. Provisional Application No. 62/400,989, filed Sep. 28, 2016, the entire contents of which are hereby incorporated by reference herein.

BACKGROUND

Fifth Generation (5G) wireless systems may support a number of different communication types, including enhanced mobile broadband (eMBB), ultra-reliable low latency communication (URLLC), and massive machine-type communication (mMTC). Each of these communication types may have different transmission and latency requirements and networks may be required to efficiently allocate resources for each while minimizing conflicts and interference.

SUMMARY

Embodiments include methods, systems, and apparatuses for using one or more radio resource allocation regions (RRARs) to preempt transmission of data for a first type of transmission and transmit data for a second type of transmissions. The one or more RRARs may be preconfigured and data may part of a larger radio resource allocation for the first type of transmission. Data may be transmitted in the one or more RRARs without prior scheduling. A WTRU may receive an indication that the transmission of data for the first type of transmission was preempted in a subsequent transmission frame and may process the data of the first transmission type accordingly.

BRIEF DESCRIPTION OF THE DRAWINGS

Furthermore, like reference numerals in the figures indicate like elements, and wherein.

DETAILED DESCRIPTION

Figure 1A:
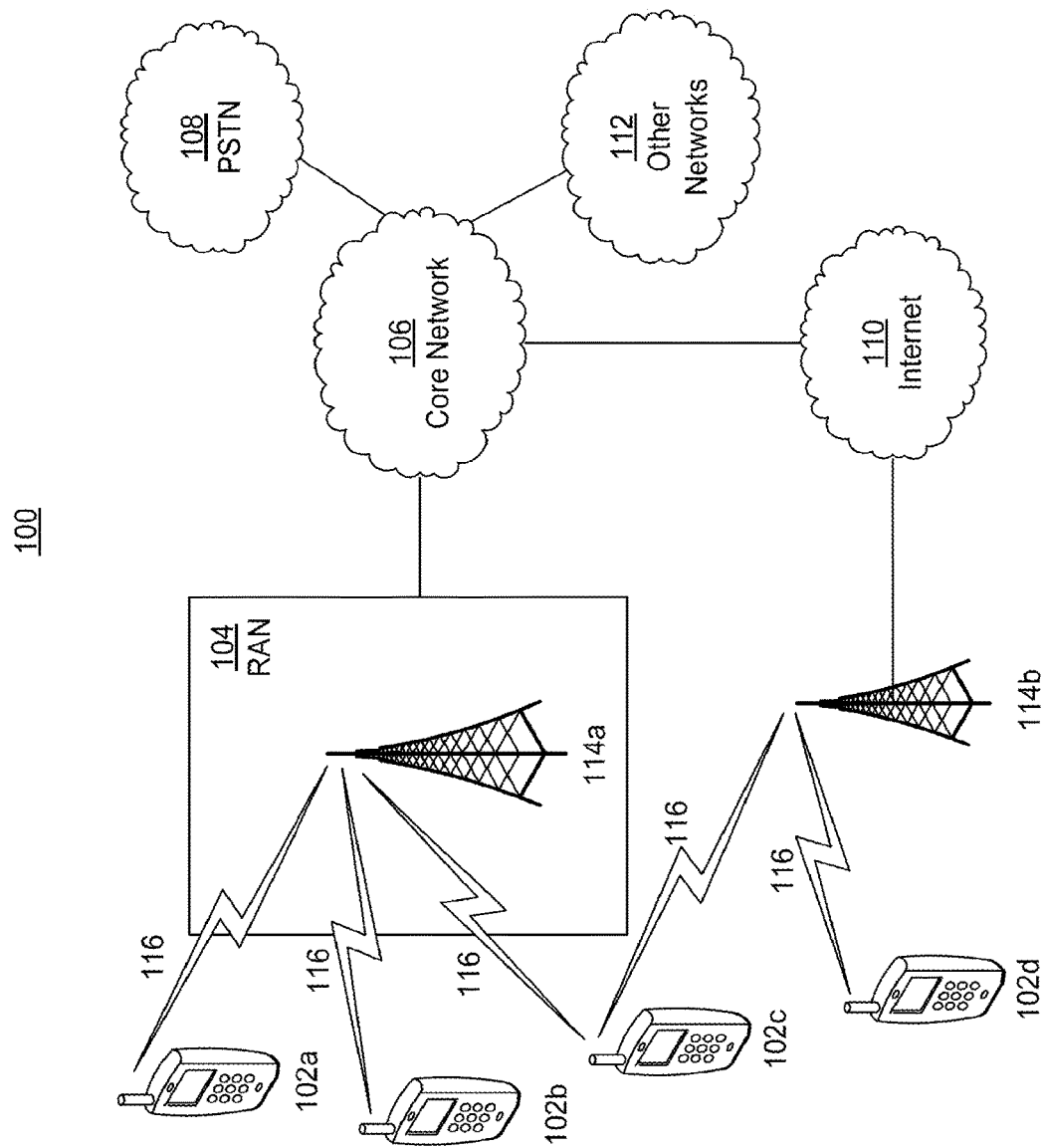
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
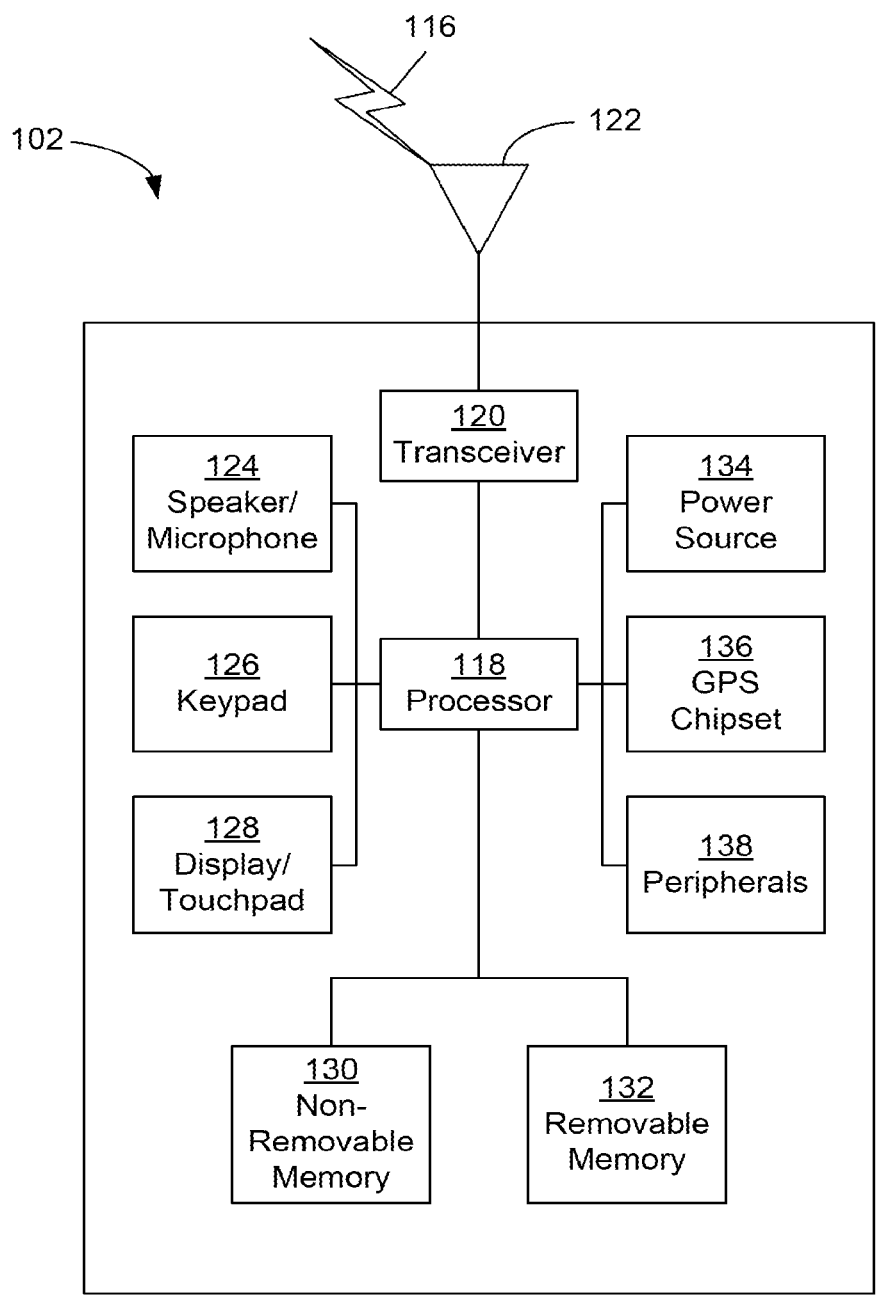
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
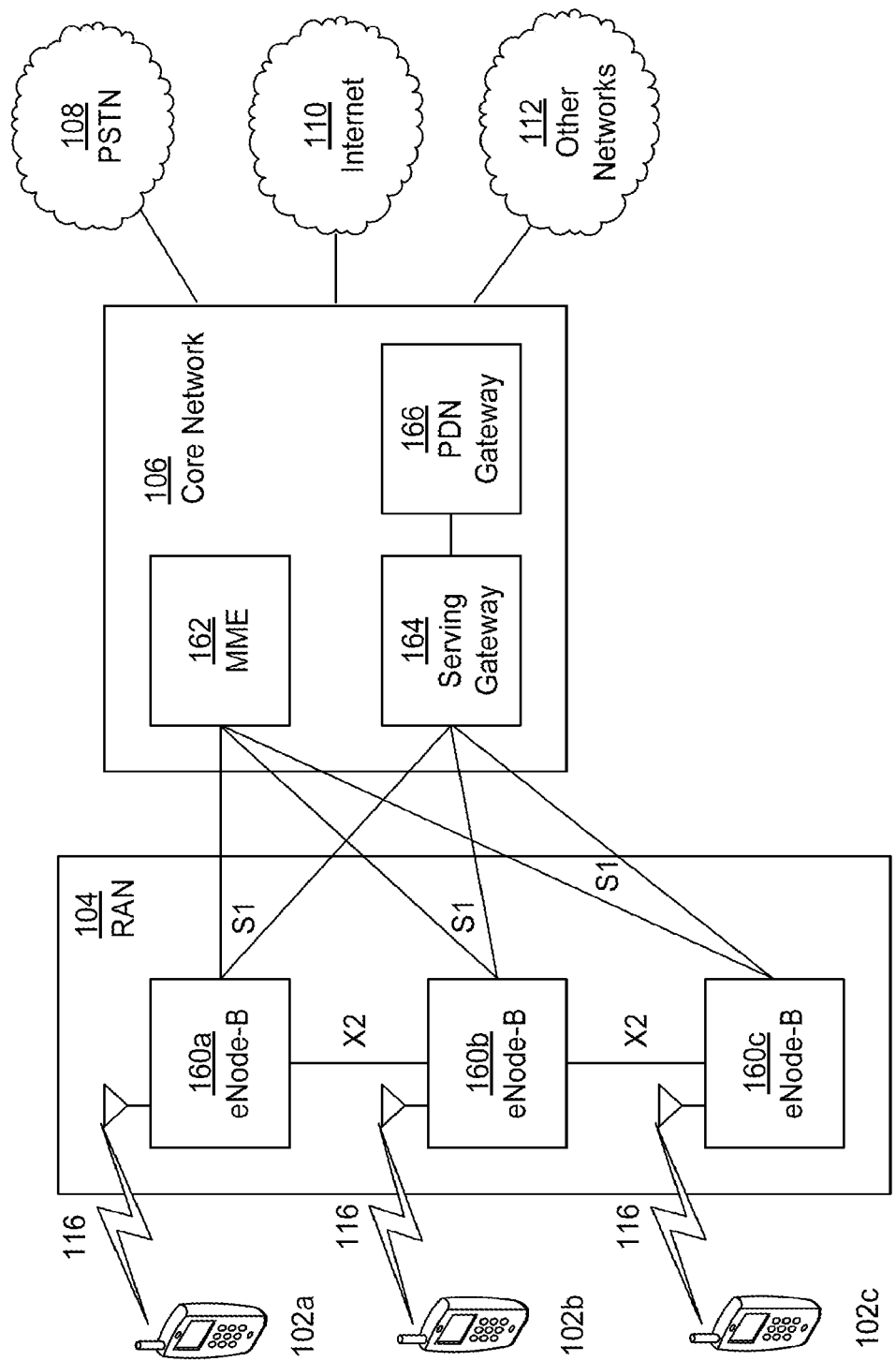
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with one other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
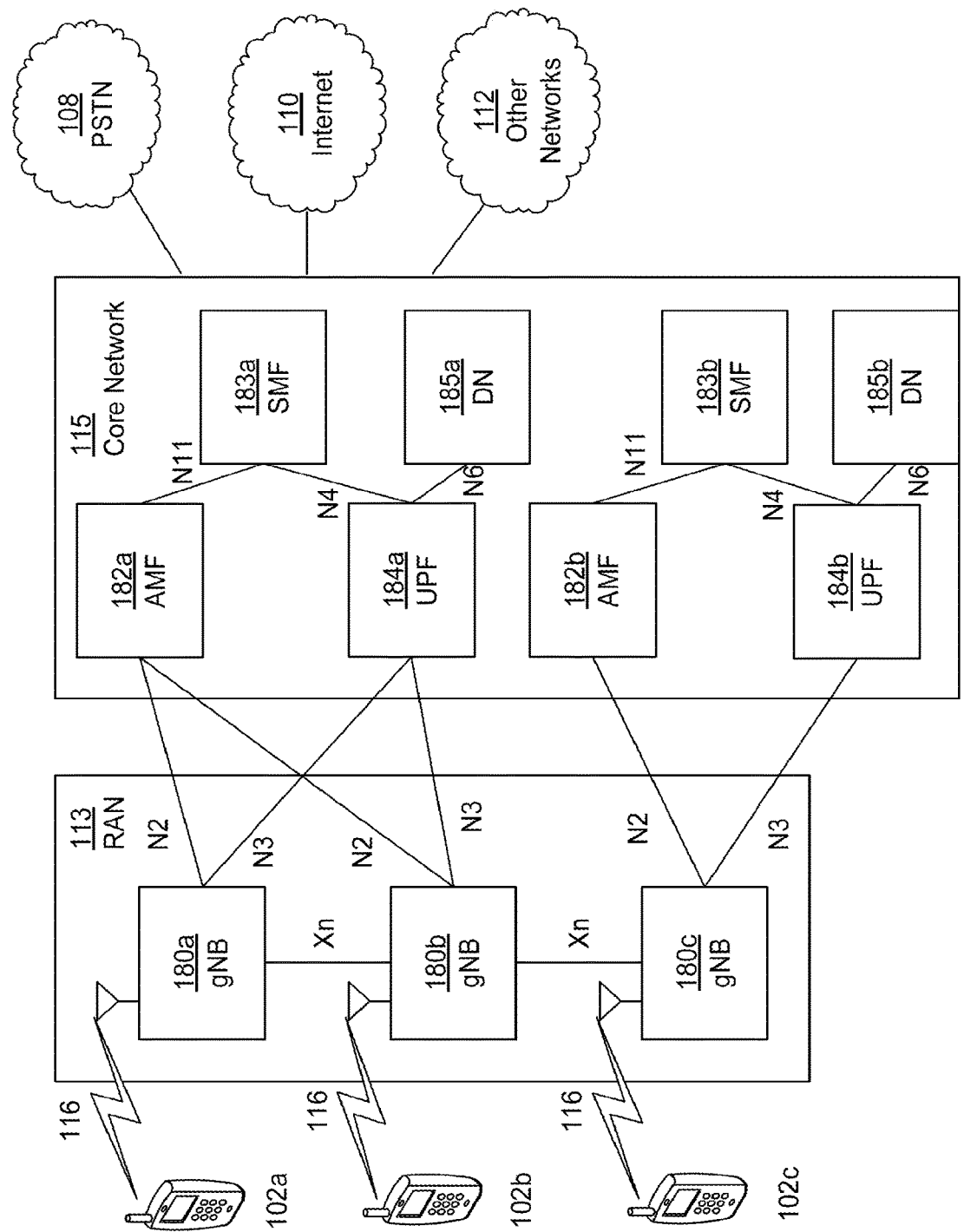
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

The gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU as used in the embodiments described herein and the associated figures may include a WTRU, STA, or other device configured to operate in a wireless communication system. Accordingly, the terms WTRU, STA, or other device configured to operate in a wireless communication system may be used interchangeably in the embodiments described herein and the associated figures.

As described above, the 5G NR air interface may support a number of different transmission types, including Enhanced Mobile Broadband (eMBB), Ultra Reliable Low Latency Communication (URLLC), and Massive Machine-Type Communications (mMTC).

In the 5G system, eMBB may cover a broad range of use cases similar to mobile broadband data being delivered today by 3G, HSPA, or 4G LTE networks. Many applications may require eMBB due to ever-increasing demand in terms of data rates for wireless data delivery to devices in hot spots and in wide-area coverage. Hotspots often require very high data rates, support very high user densities, and demand very high capacity. Wide-area coverage often requires support for mobility and a seamless user experience, but may have somewhat lower requirements in terms of user densities and data rates available to users.

URLLC may be used in conventional communication scenarios involving humans, but may also imply machine-centric communications, which may be referred to as critical machine-type communication (C-MTC). Examples of C-MTC include vehicular type communications, wireless control for industrial equipment, and smart grid control applications. URLLC may be used in gaming over wireless connections. URLLC may have very stringent requirements imposed onto latency, reliability and availability. In the case of gaming over wireless connections, the low-latency requirement is combined with the need to support high data rates.

The main characteristic of mMTC is a large number of wirelessly connected devices, each of which may have a long battery life and may operate for an extended period of time. These devices may require infrequent transmissions of small size data packets that may not be particularly delay sensitive. In certain use cases, an extremely high connection density for mMTC type devices may be needed. The total number of mMTC devices present in the wireless system may pose a number of challenges.

Each of these transmission types may have very different requirements in terms of user plane latency and required coverage levels. For example, URLLC operation may require very low transfer delay latency (<0.5 ms) on the interface between a NR-eNB/TRP and a WTRU (i.e., the Uu interface). In order to meet high reliability targets in terms of extremely low residual packet error rates following Physical Layer (L1) and higher layer processing, the supported link budget may need to be sacrificed. URLLC may result in short bursts of data transmission in the order of 100-200 μs in L1. Accordingly, there may be limited opportunities for possible hybrid automatic repeat request (HARQ) re-transmissions per each HARQ process. In addition, very tight requirements may be imposed onto allowable scheduling delay due to the compressed Uu transfer delay timeline.

Conversely, many mMTC applications may require an extended or extreme coverage levels with a high maximum coupling loss (MCL). Latency requirements for successful data delivery in many mMTC applications may be very relaxed. For example, they may only be in the order of seconds or tens of seconds.

For eMBB, latency requirements may not be as stringent as those for URLLC. Very low latency for packet transfers may be beneficial at the initial stage of data transmission in order to avoid a TCP slow start that negatively affects the overall user packet delay during packet transfers. Given the significant amounts of data transferred for an eMBB user, long sequential bursts of high volume data are often transferred. This may result in a wide instantaneous bandwidth occupation for a scheduled eMBB transmission and the use of long DL or UL transfer intervals in the order of at least 0.5-1 ms.

There may be significant design changes in the 5G NR radio interface when compared to 4G LTE. One reason for changes may be to support a much larger variety of 5G NR use case families with more challenging and diverse sets of service requirements. Another reason for changes may be the need to support these use case families in a future-proof radio design approach that is scalable and adaptable to the needs of these 5G NR use case families.

The 5G NR radio interface may support massive antenna configurations that may require changes in the way that pilot signals are assigned, transmitted, and tracked in base stations and terminals. Support for minimum overhead in NR deployments may require changes to system acquisition and initial access to avoid the always-on type of DL control signals and channels sent by LTE base stations that often result in high amounts of residual background interference, even if LTE cells don't carry traffic. Support for flexible radio access in NR may require a very high degree of spectrum flexibility and spectral containment for multiple access waveforms in order to multiplex signals of different users with different numerology and parameterization onto a channel. NR flexible radio access may also include support of different duplex arrangements, different and/or variable sizes of available spectrum allocations to different terminals, variable timing and transmission durations for DL and UL data transmissions, and variable timing of DL assignment and UL grant signaling and corresponding control signals. Flexible transmission time interval (TTI) lengths and the asynchronous UL transmissions may be supported.

It may be assumed that the NR DL and UL transmissions are organized into radio subframes of possibly variable duration. The DL and UL transmissions may be characterized by a number of fixed aspects such as location of DL control information and a number of varying aspects such as transmission timing or supported types of transmissions.

Figure 2:
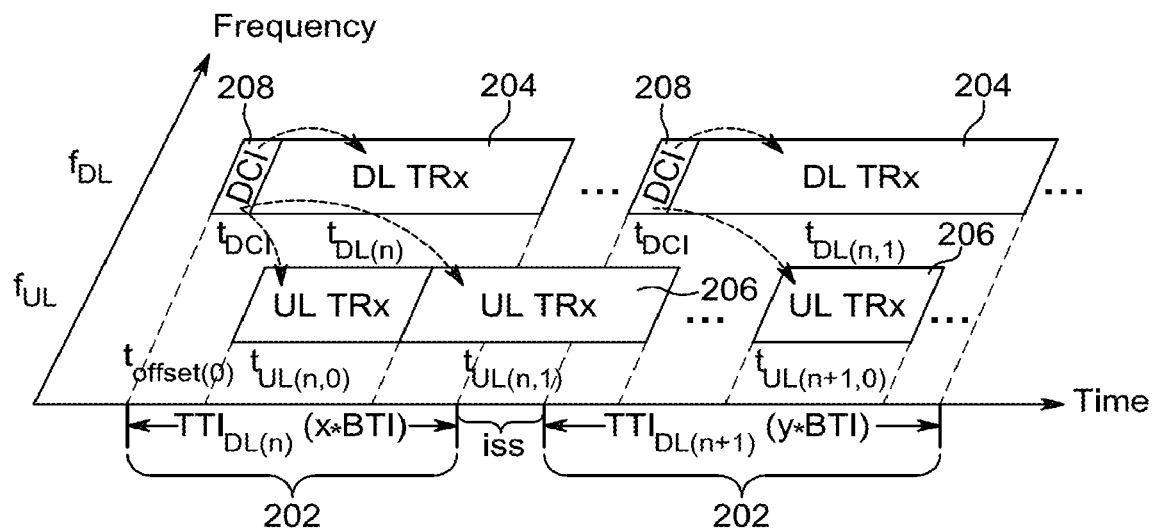
FIG. 2 is a diagram illustrating example framing and timing structures for 5G new radio (NR) in FDD.
Figure 3:
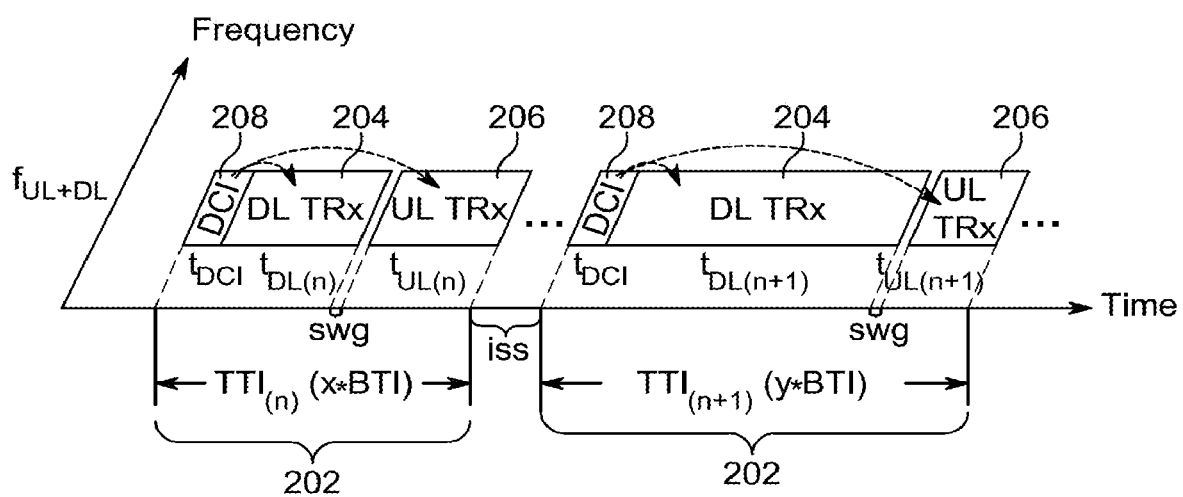
FIG. 3 is a diagram illustrating example framing and timing structures for 5G NR in TDD.

Referring now to FIGS. 2 and 3, diagrams illustrating example framing and timing structures for 5G NR in FDD mode and TDD mode, respectively, are shown. A basic time interval (BTI) may be expressed as a number of one or more OFDM symbols, wherein symbol duration may be a function of the subcarrier spacing applicable to the time-frequency resource. In NR, subcarrier spacing and/or OFDM channelization may differ for different channels multiplexed on a given carrier. For FDD, subcarrier spacing and/or OFDM channelization and parameterization may differ between the UL carrier frequency (fug) and the DL carrier frequency (fDL).

A TTI 202 may be a time interval supported by the system between consecutive transmissions. The TTI 202 may be associated with different transport blocks for the DL 204 and for the UL 206. Control information may be included, such as downlink control information (DCI) 208 for DL transmission and uplink control information (UCI) for UL transmissions. A TTI 202 may be expressed as a number of one of more BTIs and/or as a function of OFDM channelization and parameterization.

A NR subframe may contain DCI 208 of a certain time duration $t_{dci}$ and downlink data transmissions (DL TRx) 204 on the concerned carrier frequency (e.g., $f_{UL+DL}$ for TDD and $f_{DL}$ for FDD). There may be multiple DCIs 208 per transmission interval. The time/frequency location of the DCIs 208 may occur before the data or DCIs 208 may be multiplexed with data.

For TDD duplexing, a frame may include a DL portion, which may include a DCI 208 and DL TRx 204, and also an UL portion, which may include an UL TRx 206. A switching gap (SWG) may precede the UL portion of the frame, if present. For FDD duplexing, a subframe may include a DL reference TTI 202 and one or more TTIs 202 for the UL. The start of an UL TTI 202 may be derived using an timing offset ($t_{offset}$) applied from the start of a DL reference frame when compared with the start of an UL subframe.

Figure 4:
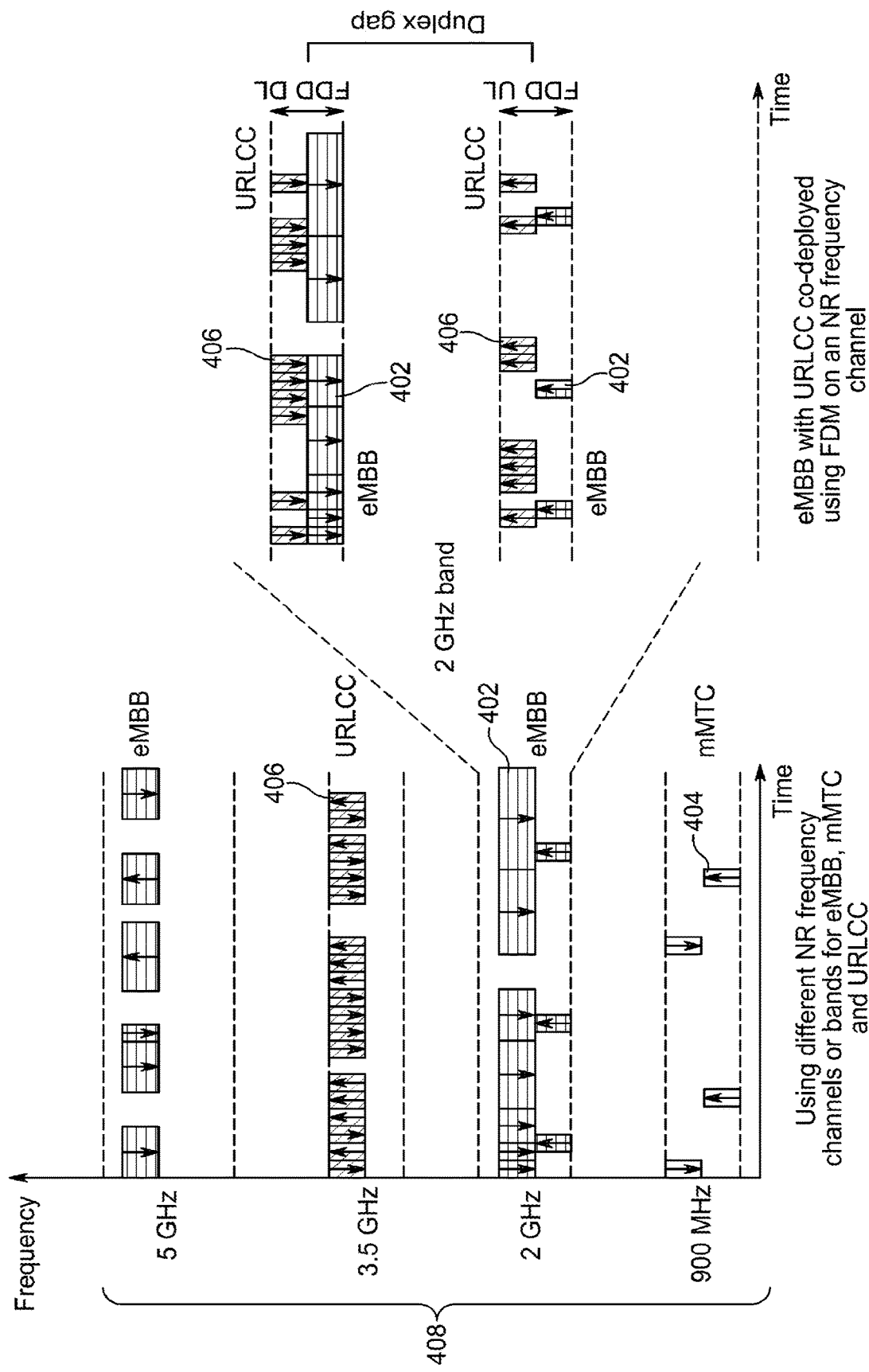
FIG. 4 is a diagram illustrating frequency domain multiplexing (FDM)

Referring now to FIG. 4, a diagram illustrating frequency domain multiplexing (FDM) is shown. In order to support multiple types of traffic at the same time, the 5G NR radio network may use FDM and may segregate eMBB transmissions 402, mMTC transmissions 404, and URLLC transmissions 406 on different NR frequency channels 408. The different NR frequency channels 408 may be located on different frequency bands. For example, when extended coverage for mMTC type of devices is provided, the use of the lower sub-1 GHz bands may be preferred due to their much better propagation characteristics. In other cases, such as when dedicated type of URLLC applications are used, it may be expected that dedicated frequency deployments are at least initially preferred due to a much better control over service quality.

The use of FDM for the purpose of multiplexing different traffic types may also be used in a single shared frequency channel with different allocated bandwidth regions located on that carrier. Different numerologies may also be used in the different bandwidth regions. As shown in FIG. 4, a 2 GHz FDD carrier may be split into an eMBB region for eMBB transmissions 402 and a dedicated URLLC bandwidth region for URLLC transmissions 406. This approach may be similar to conventional guard-band or inband types of deployment.

Figure 5:
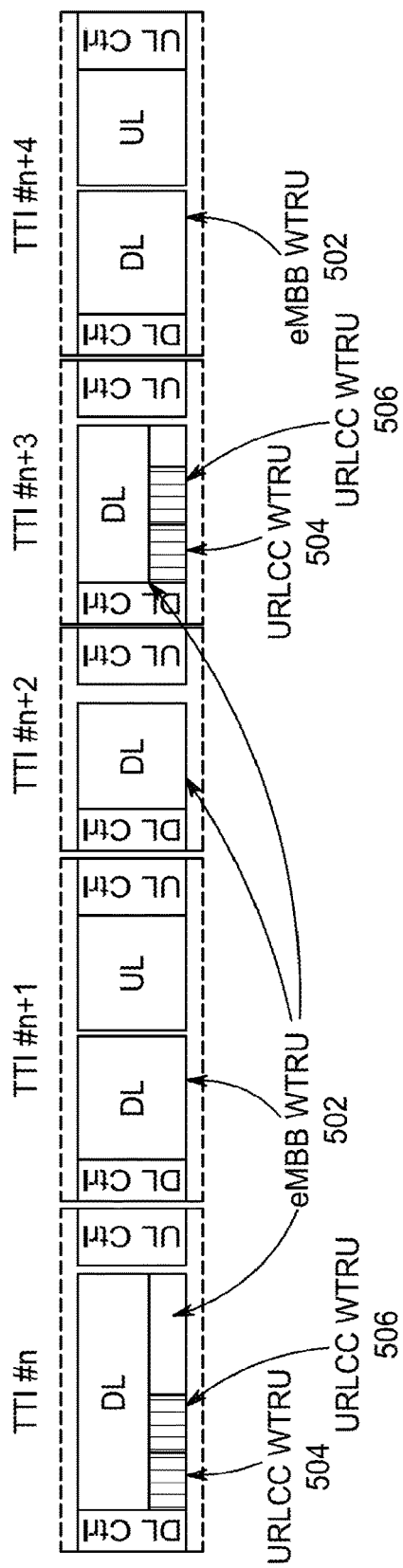
FIG. 5 is a diagram illustrating time domain multiplexing (TDM) and FDM of different NR traffic types.

Referring now to FIG. 5, a diagram illustrating time domain multiplexing (TDM) and FDM of different NR traffic types is shown. As shown in FIG. 5, both FDM and TDM may be used on a frequency channel and the eMBB WTRU 502 and URLLC WTRU 504, URLLC WTRU 506 may be assigned variable-length TTIs of different duration. If no transmission activity occurs in the bandwidth region allocated to URLLC, the eMBB WTRU may reclaim transmission resources as long as flexible control channel and DL Physical Shared Channel (PSCH) assignment protocols are supported.

There may be several problems associated with the FDM and/or TDM multiplexing approaches shown in FIGS. 4 and 5 due to signaling and traffic characteristics of the eMBB, URLLC and mMTC services.

For example, FDM is not spectrally efficient when different dedicated NR frequency channels on different bands are used. An entire carrier may need to be reserved exclusively for one type of radio service and that carrier may see only small resource utilization. This drawback is significant especially in the case where traffic is expected to be sparse and bursty, such as in URLLC. Referring to FIG. 5, even in the case of FDM and TDM, the remainder of the DL RBs granted to URLLC WTRU 504 and URLLC 506 may go unused if conventional frequency-domain restricted allocations are used. Accordingly, relying on traditional FDM and/or TDM service multiplexing approaches may not utilize all available radio resources resulting in a low spectral efficiency.

Another issue is that low and medium data rate intermittent traffic generated by many machine-type use cases such as URLLC may generally result in short interference bursts requiring almost instantaneous transmission once a PDU arrives. On a given frequency channel, some TTIs may need to contain both eMBB and URLLC data packets. In many other TTIs, there may only be eMBB data carried on a DL PSCH. As described above, eMBB transmissions have a much larger allowable Uu delay budget than URLLC. Accordingly, the initial eNB scheduling step for multiplexed eMBB users may select the essential transmission parameters that determine the L1 and front-end processing and memory buffering requirements. On the other hand, URLLC transmissions may be small data units with much shorter allowable Uu delay budgets. A scheduling decision to transmit data for a URLLC user in a given DL transmission interval may be possible only in the very last moment.

Figure 6:
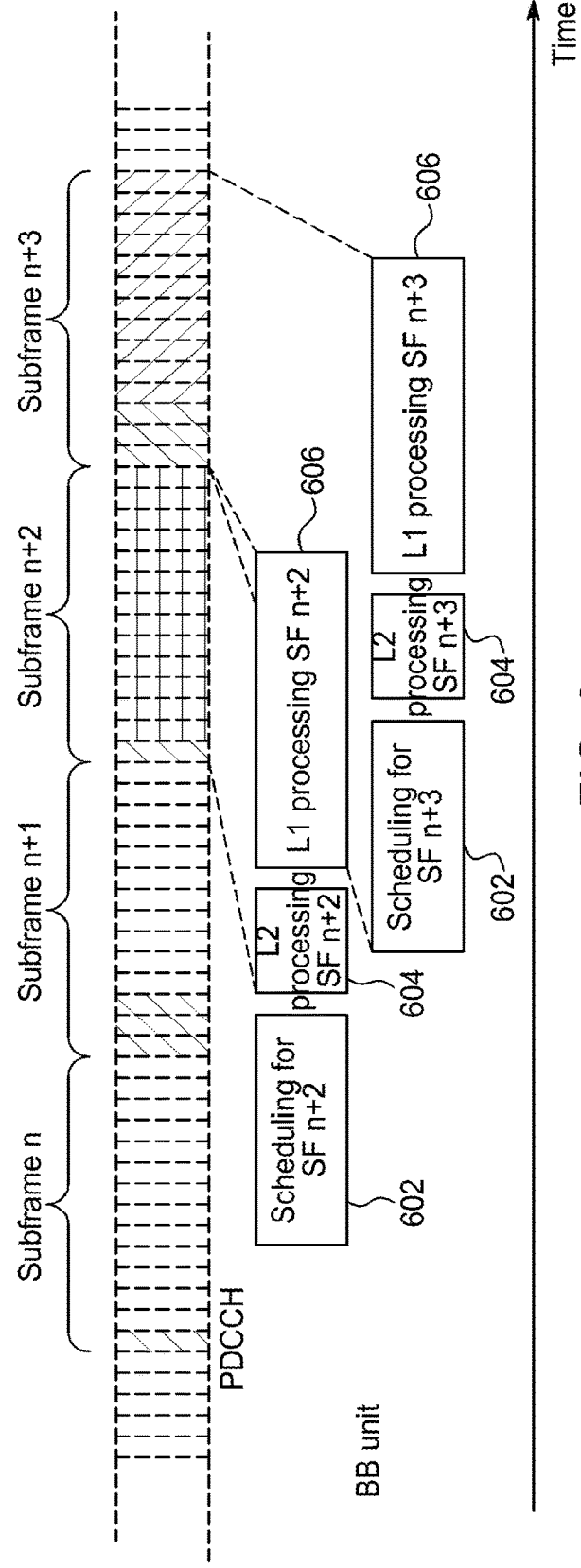
FIG. 6 is a diagram illustrating conventional processing steps prior to a downlink (DL) transmission.

Referring now to FIG. 6, a diagram illustrating conventional processing steps prior to a DL transmission is shown. As shown in FIG. 6, several functions may need to be performed before a DL transmission actually starts. An eNB may need to make a scheduling decision 602, then may need to perform L2 processing 604 followed by L1 processing 606 for a DL PSCH. If the baseband (BB) unit is connected to a remote radio head (RRH), digital samples may also need to be transmitted to the RRH prior to the DL transmission.

Before a scheduling decision 602 is made by the eNB, several factors may be accounted for, including, but limited to: channel state feedback, traffic queues, possible re-transmissions for live queues, quality of service (QoS), and access stratum (AS) or non-access stratum (NAS) signaling needs. As a result of the scheduling decision, one or more WTRUs may be selected for the transmission period. In addition, transport block size, modulation order, and PRB allocations may be determined prior to the transmission.

L2 processing 604 may involve the AS protocol handling and management of the memory buffer to ensure data integrity. The control plane requirements may also affect this processing stage.

L1 processing 606 may be more extensive and may include a cyclic redundancy check (CRC), channel encoding, and rate matching of coded blocks, which may then be followed by scrambling, modulation and spatial layer mapping (including precoding). Control symbols like a reference signal (RS) may be inserted into the BB sequence generated from data. Finally, digital BB front-end processing may be performed, which may include DFT and BB filtering or windowing. At the end of this step, digital IQ samples may be generated for the entire transmission covering the entire subframe. Significant memory may be required, so the last L1 processing step may be executed as shortly as possible before the actual DL transmission occurs. If transport to the RRH unit is required from the eNB BB unit, additional delays may also be budgeted for transport over the distribution network.

As can be seen, significant processing delays (e.g., 1-1.5 ms) may be incurred for MBB and eMBB types of data services before the DL transmission in a subframe or TTI actually starts.

As shown in FIG. 6, transport block sizes for users multiplexed into a given subframe may already be determined during the initial eNB scheduling decision in step 602. The number of coded bits for the transport block of a particular user computed during L1 processing, which may determine the memory needs in the L1 processing step 606, may actually be obtained much earlier (e.g., after the eNB scheduling). The number of coded bits may be dependent only on the number of allocated RBs, the modulation order, and the presence of L1 signals (e.g., RS or control channels) present in a subframe.

It may not be desirable to change a multiplexing decision for a given user during scheduling and processing in L1 and higher layers. Once the eNB makes the scheduling decision, either to change the determined transport block size for a selected user or to add a user to an already scheduled and processed DL transmission interval, the L1 processing and front-end buffering memory may be affected extensively.

Due to very tight Uu delay budgets for URLLC applications, the required URLLC scheduling delay may be much smaller than what eMBB type of scheduling is able to afford. For example, if URLLC data with an allowed total Uu delay budget of 4 ms arrives while an eMBB transmission burst, scheduled 1-1.5 ms prior to the DL transmission burst with a duration of 2 ms, just started or is in progress, the latency requirement of URLLC may be difficult or impossible to meet. If URLLC traffic has to wait to be scheduled (i.e. after the 2 ms eMBB transmission terminates), a significant portion of its short allowable 4 ms Uu delay budget may no longer be used for re-transmissions. As a result, the supported data rate for URLLC for a given packet error rate may be greatly decreased, and/or the achievable link budget and radio range may be greatly reduced. URLLC transmissions that need to be completed in less than 2 ms may be completely impossible. Alternatively, if URLLC PDUs are scheduled and inserted last moment (i.e., when a PDU becomes available in the Tx buffer into the already scheduled 2 ms eMBB transmission), either eNB memory and buffering requirements may be increased or radio link performance may be impacted. In addition, scheduling opportunities in the DL transmission intervals may need to be provided, which may pose additional challenges.

Another problem is that traditional FDM and/or TDM service multiplexing approaches for different types of NR use cases may not allow support for the desired service-specific Uu delay requirements when being concurrently deployed.

Methods and apparatuses described below may support efficient multiplexing of data services in the presence of very different radio performance requirements. The methods and apparatuses may overcome the observed limitations of existing techniques, which may result in decreased radio performance or increased complexity for the transmitter/receiver implementations. The methods and apparatuses may accommodate the possibility of multiplexing by means of FDM and/or TDM whereby short-delay types of transmissions such as those exemplified by URLLC may be scheduled, processed, and transmitted even if large-delay types of transmissions such as those exemplified by eMBB were scheduled much earlier and their transmission may be ongoing in the DL transmission interval.

It should be noted that in the following description, a TTI may refer to one or more of the following periods. A TTI may refer to a subframe, slot, or mini-slot. A TTI may refer to a period of time starting from the transmission of downlink control information scheduling at least one transport block and ending before or at the transmission of downlink control information scheduling subsequent transport blocks. A TTI may refer to a number of OFDM symbols in a reference numerology (e.g., based on a subcarrier spacing of 15 kHz) or in the numerology used for the transmission of control information or data.

An interval in the frequency domain may be expressed in terms of Hz (or kHz), in terms of a number of subcarriers or a number of resource blocks in a reference numerology (e.g. based on a subcarrier spacing of 15 kHz), or in the numerology used for the transmission of control information or data. A continuous frequency allocation may be defined in terms of a starting or ending frequency, subcarrier, or resource blocks, and an interval in the frequency domain. A discontinuous frequency allocation may be defined in terms of a set of continuous frequency allocations.

Radio resource allocation regions (RRARs) may be configured to allow for transmission of different types of traffic. A set of one or more well-identified and limited time/frequency regions may be configured for a NR frequency channel within a larger set of allowed or possible time/frequency radio resources in which radio transmissions with one or more designated WTRUs take place.

The RRAR may identify and designate a specific portion of radio resources that may be smaller than what a device may access. The RRARs may be identified and used in the context of DL, UL, sidelink, and backhaul transmissions.

A RRAR may be a single contiguous time/frequency region, or it may include multiple, distinct, possibly not contiguous time/frequency regions defined as a single RRAR. Without loss of generality, the following description may refer to RRARs as single contiguous time/frequency regions. However, the methods and procedures described herein may include RRARs defined to include sets of multiple well-identified time/frequency regions.

Figure 7:
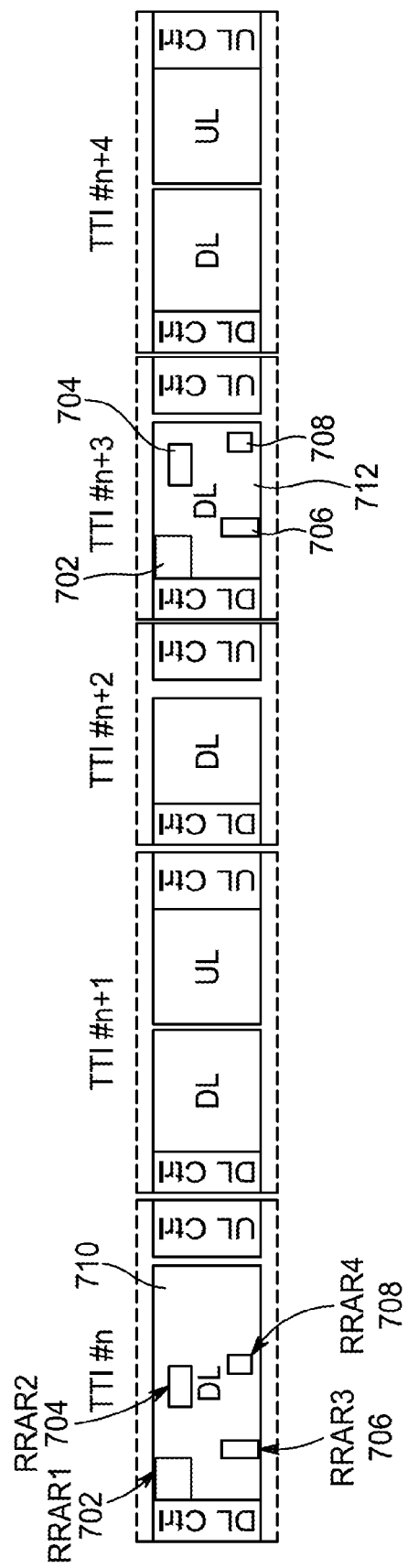
FIG. 7 is a diagram illustrating one or more radio resource allocation regions (RRARs) in a DL transmission.

Referring now to FIG. 7, a diagram illustrating one or more RRARs in a DL transmission is shown. FIG. 7 shows a transmission configured with a first RRAR 702, a second RRAR 704, a third RRAR 706, and a fourth RRAR 708 in a first DL transmission 710 of TTI #n. It should be noted that any number of RRARs may be used.

The one or more RRARs may be defined and identified using well-identified and limited time/frequency regions with respect to the overall radio resources that make up a frequency channel. Alternatively, the one or more RRARs may be defined and identified with respect to a particular transmission for a device. The one or more RRARs may be defined in absolute or in relative terms, such as with respect to a reference downlink resource configured by RRC signaling. For example, in the frequency domain, the one or more RRARs may be defined as a frequency allocation within a bandwidth part and/or carrier. The one or more RRARs may be defined implicitly. For example, in the time domain, a slot or mini-slot immediately preceding the slot or mini-slot in which DCI or a pre-emption indicator may indicate that a RRAR does not contain useful symbols for the WTRU The first RRAR 702 may be defined in terms of a subset of physical resource blocks of a given numerology and of a specific mini-slot that may be identified by a starting OFDM symbol and a number of OFDM symbols.

A NR system may use a 10 MHz wide FDD DL and UL channel pair and a TTI of 0.5 ms duration. A WTRU may access the entire 10 MHz DL channel, which may be scheduled at the beginning of each 0.5 ms TTI. In a first example, a RRAR may be identified as a second, smaller, and limited subset of possible time/frequency allocations within the first set of the entire 10 MHz wide resources. An RRAR may be configured in absolute terms, such that occurs only every 10th TTI occurrence and may include only a single 180 kHz portion within the overall 10 MHz FDD DL channel. Accordingly, the RRAR may comprise only $\frac{1}{500}$ of the overall time/frequency resources available on the FDD DL channel.

In another example, an RRAR may be defined in relative terms for a specific WTRU as a designated occurrence in terms of symbol intervals and/or frequency position. The occurrence may be determined by a rule accounting for particular transmission settings in the TTI. A WTRU may receive a data transmission 5 MHz wide over a duration of 2 ms or a data transmission of 25 RBs of 180 KHz each with 28 OFDM symbols. One or more RRARs may be defined in 4 possible occurrences with a symbol offset of every 5 symbols from the start of the data transmission for a certain length and for a limited duration of 3 symbols each. The WTRU may determine 4 RRAR positions relative to the received DL data transmission in the 2 ms interval. If another data transmission is received by the WTRU, for example, of length 14 OFDM symbols or 1 ms duration, then the WTRU may only determine 2 possible RRAR occurrences.

An RRAR may be configured and/or defined with recurrence periods. The recurrence periods may be periodic or may be defined by means of allocation patterns that indicate allocations in time or frequency. An example for time allocations may be a bitmap indicating which one of the possible TTIs a WTRU may consider to contain a valid RRAR occurrence, possibly in combination with a frequency allocation. A bitmap for a RRAR may indicate which subframes in a set of selected, consecutive, or non-consecutive subframes may be valid RRAR allocations. The resources of a RRAR may change from one TTI, or subframe, to another according to a cyclic or pseudo-random pattern. As shown in FIG. 7, the first RRAR 702, the second RRAR 704, the third RRAR 706, and the fourth RRAR 708 have a recurrence period of every 3 TTIs and occur again in a second DL transmission 712 in TTI #n+3.

An RRAR may be associated with particular transmission characteristics. For example, an RRAR may be associated with one or more of a selected OFDM numerology, subcarrier spacing, symbol length, CP configuration, bandwidth in terms of number of RBs, subcarriers, or selected antenna transmission configuration (e.g., beam or beam process), and scheduling mode.

An RRAR may be determined as a function of a particular transmission event. For example, if an RRAR occurrence is scheduled in a given TTI, but the actual DL transmission burst is not long enough to accommodate the start position of the RRAR, or the DL transmission burst cannot accommodate the entire duration of the RRAR, the WTRU may consider the RRAR as not valid for that particular TTI occurrence. A RRAR may be considered to occur if the TTI length is in excess of a minimum threshold length. In yet another example, only a TTI indicating unicast transmissions may be considered for RRAR.

The RRARs may be designated identifiers that may be signaled very efficiently. This is of particular importance in the context of scheduling and allowing for efficient multiplexing of different service types.

An RRAR may be configured by a first device, such as a base station, by means of a first signaling message. RRC or protocol control signaling may be used to configure or activate, re-configure, or de-activate an RRAR for a second device, such as a WTRU. The signaling may comprise Tx or Rx configurations and transmission characteristics associated with an RRAR, such as the region in time domain (e.g., symbols, mini-slots, and slots) or frequency (e.g., subcarriers, set or range of resource blocks, and bandwidth part). Multiple devices may be configured with the same RRAR.

The configured RRARs may be associated with an ordered set of identifiers such as by being represented by an index or bitmap. For example, the first RRAR 702, the second RRAR 704, the third RRAR 706, and the fourth RRAR 708 may be assigned distinct labels that may be used for signaling by means of 2 bits or 4 code points.

A device may determine an identifier or index value associated with an RRAR configuration and use the received or derived value in a second message to determine whether an RRAR was used for a transmission. For example, a signaling field in a DCI may indicate which RRARs from a preconfigured set of RRARs was used or may be used for a transmission. The signaling field may indicate which RRARs if the preconfigured set of RRARs are not in use. The DCI may be a common DCI transmitted to one or more WTRUs.

A configured RRAR may be indicated to a device to signal that processing for a previously received transmission may need to be adjusted as a function of another transmission.

Figure 8:
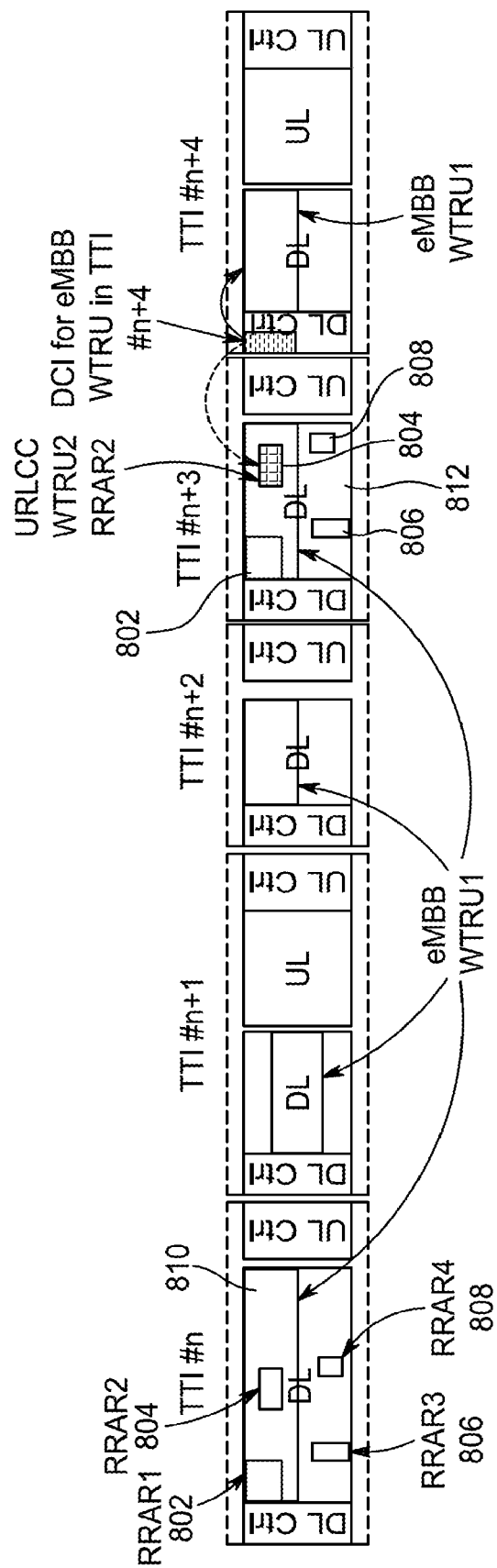
FIG. 8 is a diagram illustrating dynamic scheduling of multiple services using RRARs.

Referring now to FIG. 8, a diagram illustrating dynamic scheduling of multiple services using RRARs is shown. A first RRAR 802, a second RRAR 804, a third RRAR 806, and a fourth RRAR 808 may be preconfigured and scheduled for a first DL transmission 810 in TTI #n and a second DL transmission 812 in TTI #n+3. A first WTRU may receive eMBB data transmissions in TTIs #n, TTI #n+1, TTI #n+2, TTI #n+3, and TTI #n+4.

Despite the presence of the first RRAR 802, the second RRAR 804, the third RRAR 806, and the fourth RRAR 808 in TTI #n, no transmissions to other devices may have taken place. In TTI #n+3, the eNB may schedule a last moment transmission for a second WTRU, which may use URLLC, using the second RRAR 804 and may transmit the URLLC data in the corresponding radio resources. This may be done by puncturing the ongoing eMBB data transmission for the first WTRU in the TTI #n+3. In the subsequently received TTI #n+4, the first WTRU may receive DL control signaling (e.g., a DCI), which in addition to the scheduling parameters for the current TTI #n+4, may indicate that the previous transmission received in TTI #n+3 was punctured by another transmission in the second RRAR 804. This signaling may only require 2 bits. As a result of the signaling, the first WTRU may set the received and decoded soft channels bits or metrics for the time/frequency resource elements associated with the second RRAR 804 corresponding to the transport block/HARQ process received in TTI #n+3 to zero to avoid buffer corruption during HARQ combining for that HARQ process.

Decoding performance for the first WTRU may only be impacted in that available energy per bit to noise power spectral density ratio ($E_b/N_0$) for the eMBB transmission is decreased by as much energy required to transmit the second RRAR 804, but no additional penalty is incurred. Similarly, since no semi-static resources may be set aside for possible transmissions with other devices in the configured RRARs, no system penalty in terms of spectral efficiency may be incurred. The available radio resources may be used while preserving full flexibility to schedule delay-sensitive data last moment as needed even though other longer-delay transmissions may be ongoing. Signaling using representative index values or bit representations for configured and well-identified RRARs may be done by fast and robust L1 signaling such as a DCI. The example shown in FIG. 8 may illustrate any case in which an ongoing transmission is punctured and where multiple signaling and/or scheduling opportunities are available for a given TTI.

Even though a last moment scheduling decision to use the second RRAR 804 in TTI #n+3 for the second WTRU may be taken by the eNB, in the presence of multiple signaling or scheduling occasions for this TTI, it may be possible to indicate to the first WTRU during TTI #n+3 that parts of its transmission are being punctured.

A WTRU receiving a first data transmission may be preconfigured with a set of possible RRARs. While receiving or upon reception of the first data transmission, the WTRU may receive signaling indicating that one or more of the preconfigured RRARs is received. The one or more RRARs may indicate the presence of a second transmission in the reception time interval. If a RRAR is received, the WTRU may process the received first data transmission to account for the second transmission. The WTRU may reset channel metrics or buffer/memory entries to a determined value, such as 0, or it may apply a correction factor.

Additionally, or alternatively, the WTRU may initially process the first data transmission and attempt decoding assuming that the RRARs do not contain relevant data. The WTRU may buffer soft symbols demodulated from the RRARs for potential future use. If the decoding is successful, the WTRU may discard the buffered soft symbols. If the decoding is not successful, the WTRU may receive DCI (e.g., in a subsequent transmission interval) indicating whether or not the RRARs contained relevant data for the WTRU.

The DCI may be a common DCI transmitted to one or more WTRUs. The frequency granularity of the pre-emption indication in the DCI may be configured to be a number of resource blocks within the reference downlink resource for the given numerology. The frequency granularity may be indicated by explicit signaling or implicitly derived by other RRC signaling. The number of resource blocks may correspond to the whole frequency region of the downlink reference resource. The time granularity of the pre-emption indication in the DCI may be configured to be a number of symbols within the reference downlink resource for the given numerology. The time granularity may be indicated by explicit signaling or implicitly derived by other RRC signaling. The time/frequency granularities of pre-emption indication may take into account the payload size of the group common DCI carrying the pre-emption indication.

If the DCI indicates that the RRAR did not contain relevant data, the WTRU may discard the symbols. If the DCI indicates that the RRAR did contain relevant data, the WTRU may combine the data received in the RRARs with data contained in the rest of the TTI and re-attempt decoding. The WTRU may associate the data from each RRAR to at least one code block and redundancy version, and may attempt decoding by soft-combining the data from each RRAR with the data already received (i.e., buffered) for the corresponding code block. The mapping between an RRAR and a code block may depend implicitly on the location in time and/or frequency of the RRAR, or may be explicitly indicated by the DCI.

Figure 9:
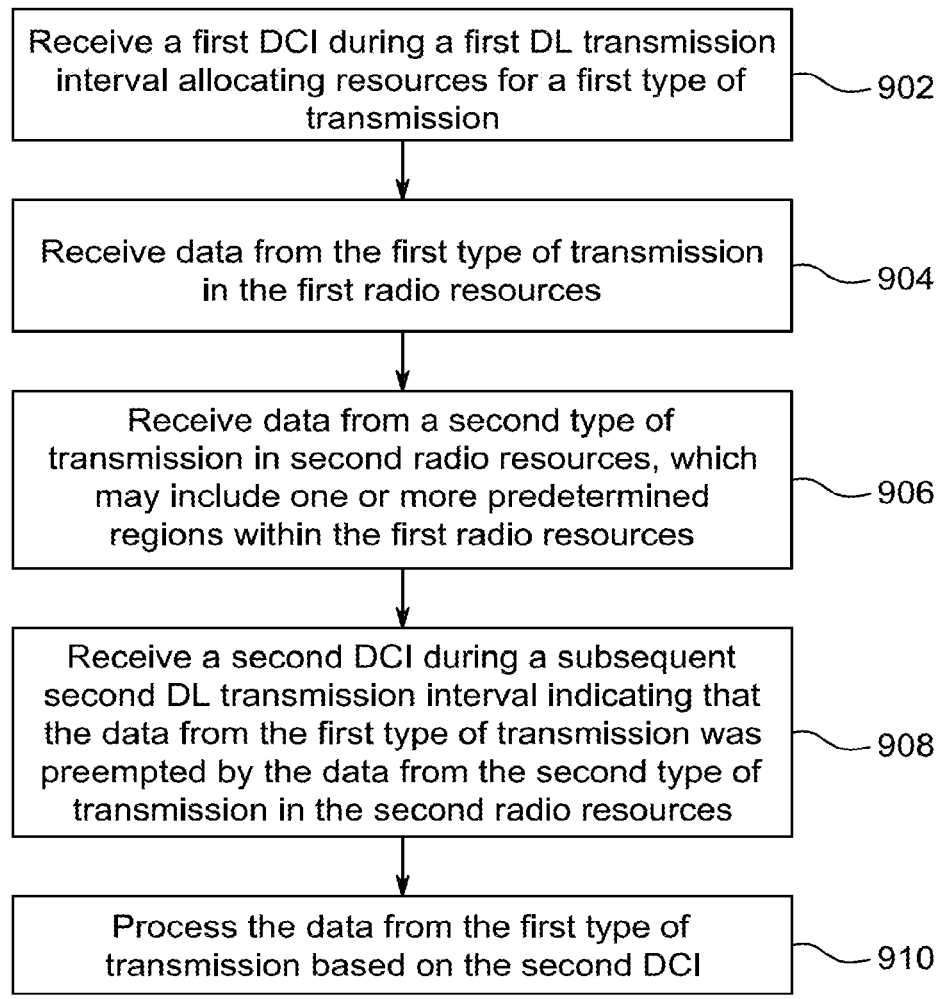
FIG. 9 is a flowchart illustrating the explicit indication of preemption before decoding.

Referring now to FIG. 9, a flowchart illustrating the explicit indication of preemption before decoding as described above is shown.

In step 902, a WTRU may receive a first DCI during a first DL transmission interval. The first DCI may allocate first radio resources in the first DL transmission interval for reception of a first type of transmission. The first radio resources may include the entire DL frequency channel and the first type of transmission may include eMBB traffic.

In step 904, the WTRU may receive data from the first type of transmission in the first radio resources.

In step 906, the WTRU may receive data from a second type of transmission in second radio resources. The second radio resources may include one or more predetermined regions within the first radio resources. The second radio resources may be one or more RRARs and the second type of transmission may include URLLC traffic. The second type of transmission may be received while the first type of transmission is being received.

In step 908, the WTRU may receive a second DCI during a subsequent second DL transmission interval. The second DCI may indicate that the data from the first type of transmission was preempted by the data from the second type of transmission in the second radio resources.

In step 910, the WTRU may process the data from the first type of transmission based on the second DCI. The processing may include determining a first set of one or more symbols associated with the data received in the first radio resources, determining a second set of one or more symbols associated with the data received in the second radio resources; and setting the second set of one or more symbols to zero to avoid buffer corruption during hybrid automatic repeat request (HARQ) processing.

Figure 10:
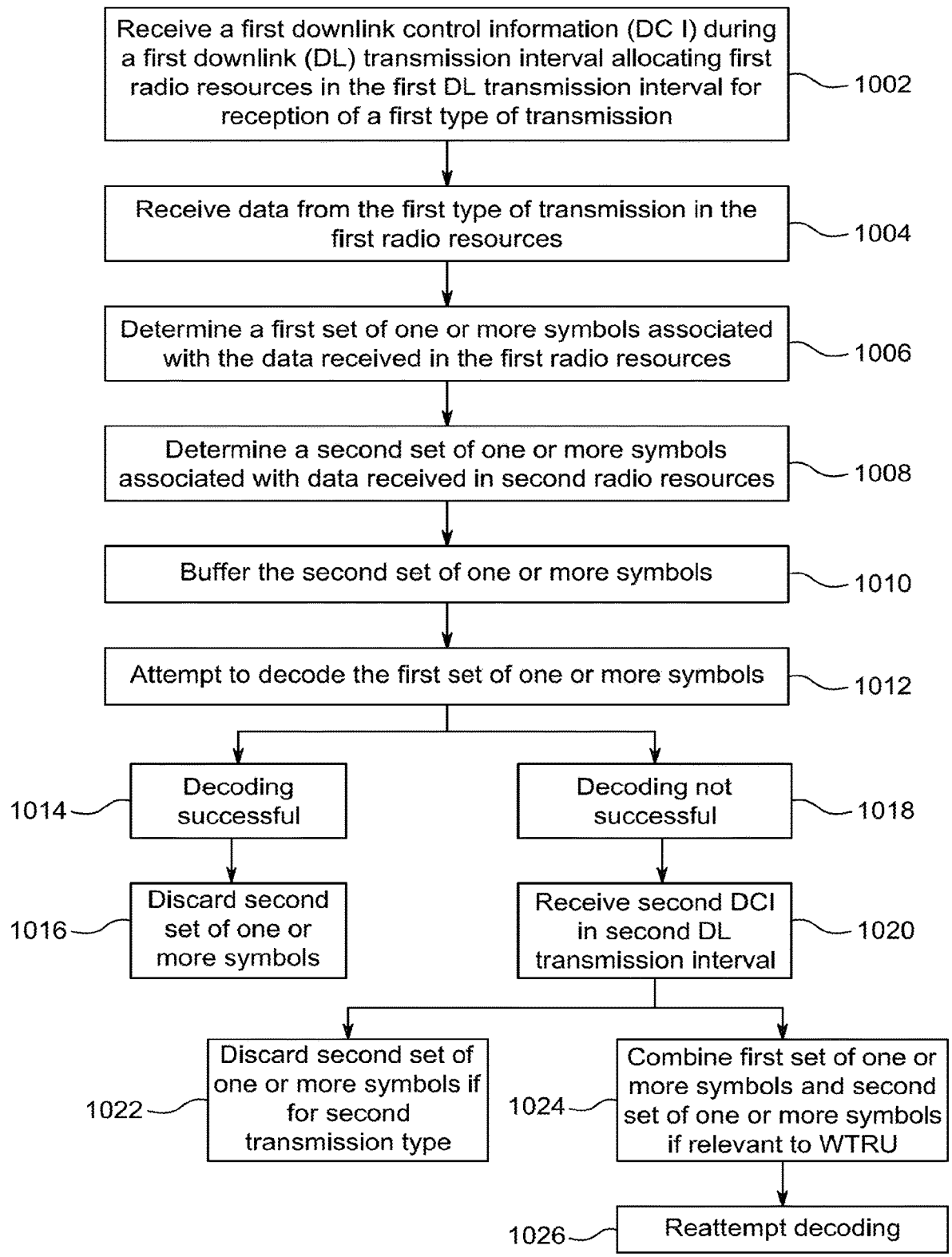
FIG. 10 is a flowchart illustrating decoding prior to indication of preemption.

Referring now to FIG. 10, a flowchart illustrating decoding prior to indication of preemption is shown.

In step 1002, a WTRU may receive a first downlink control information (DCI) during a first downlink (DL) transmission interval. The first DCI may allocate first radio resources in the first DL transmission interval for reception of a first type of transmission. The first radio resources may include the entire DL frequency channel and the first type of transmission may include eMBB traffic.

In step 1004, the WTRU may receive data from the first type of transmission in the first radio resources.

In step 1006, the WTRU may determine a first set of one or more symbols associated with the data received in the first radio resources.

In step 1008, the WTRU may determine a second set of one or more symbols associated with data received in second radio resources. The second radio resources may include one or more predetermined regions within the first radio resources. The second radio resources may be one or more RRARs.

In step 1010, the WTRU may buffer the second set of one or more symbols.

In step 1012, the WTRU may attempt to decode the first set of one or more symbols. In step 1014, the WTRU may determine that the decoding is successful. In step 1016, the WTRU may discard the buffered second set of one or more symbols.

In step 1018, the WTRU may determine that the decoding is not successful. In step 1020, the WTRU may receive a second DCI during a second DL transmission interval. In step 1022, the WTRU may discard the buffered second set of one or more symbols if the second DCI indicates that the data from the first type of transmission was preempted by data from a second type of transmission in the second radio resources. The second type of transmission may include URLLC traffic. The second type of transmission may be received while the first type of transmission is being received. In step 1024, the WTRU may combine the first set of one or more symbols and the second set of one or more symbols. In step 1026, the WTRU may reattempt decoding if the second DCI indicates that the data received in the second radio resources is relevant to the WTRU.

A WTRU may transmit one or more RRARs in the UL. A configured radio resource allocation region may be indicated to a device to signal that it may transmit in a configured RRAR.

Figure 11:
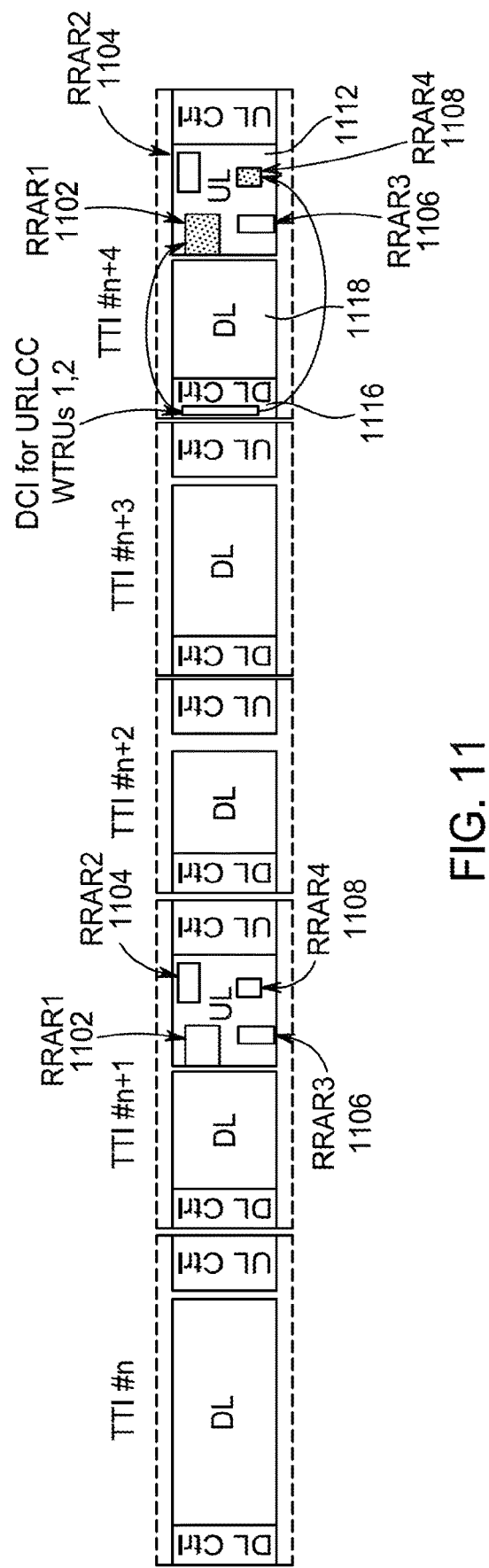
FIG. 11 is a diagram illustrating explicit activation for persistent allocations when scheduling multiple services using RRARs.

Referring now to FIG. 11, a diagram illustrating explicit activation for persistent allocations when scheduling multiple services using RRARs is shown. A first RRAR 1102, a second RRAR 1104, a third RRAR 1106, and a fourth RRAR 1108 may be configured and designated for transmission in a first UL portion 1110 of TTI #n+1 and a second UL portion 1112 in TTI #n+4. Despite the presence of the first RRAR 1102, the second RRAR 1104, the third RRAR 1106, and the fourth RRAR 1108 in the first UL portion 1110 of TTI #n+1, no transmission may take place. In TTI #n+4, the eNB may schedule a last moment transmission for two URLLC WTRUs, using the first RRAR 1102 and the fourth RRAR 1108, by means of one or more UL scheduling DCIs 1114. The one or more UL scheduling DCIs 1114 may be sent in a DL control field 1116 in the TTI #n+4, which may be sent before a DL period 1118. The first URLLC WTRU and the second URLLC WTRU may then transmit URLLC data in the assigned RRARs. The eNB may use a group DCI to schedule the uplink URLLC data.

When using representative index values or bit representations for preconfigured RRARs, fast and robust L1 signaling such as a DCI may be employed. Because only 2 bits may be required to identify a particular RRAR transmission instance, a DCI may be used to activate transmissions for more than one WTRU.

A first device may determine if it has data to transmit and may use a configured RRAR to transmit data if the RRAR is available. A second device may determine the presence or absence of data transmission from the first device in the RRAR.

Figure 12:
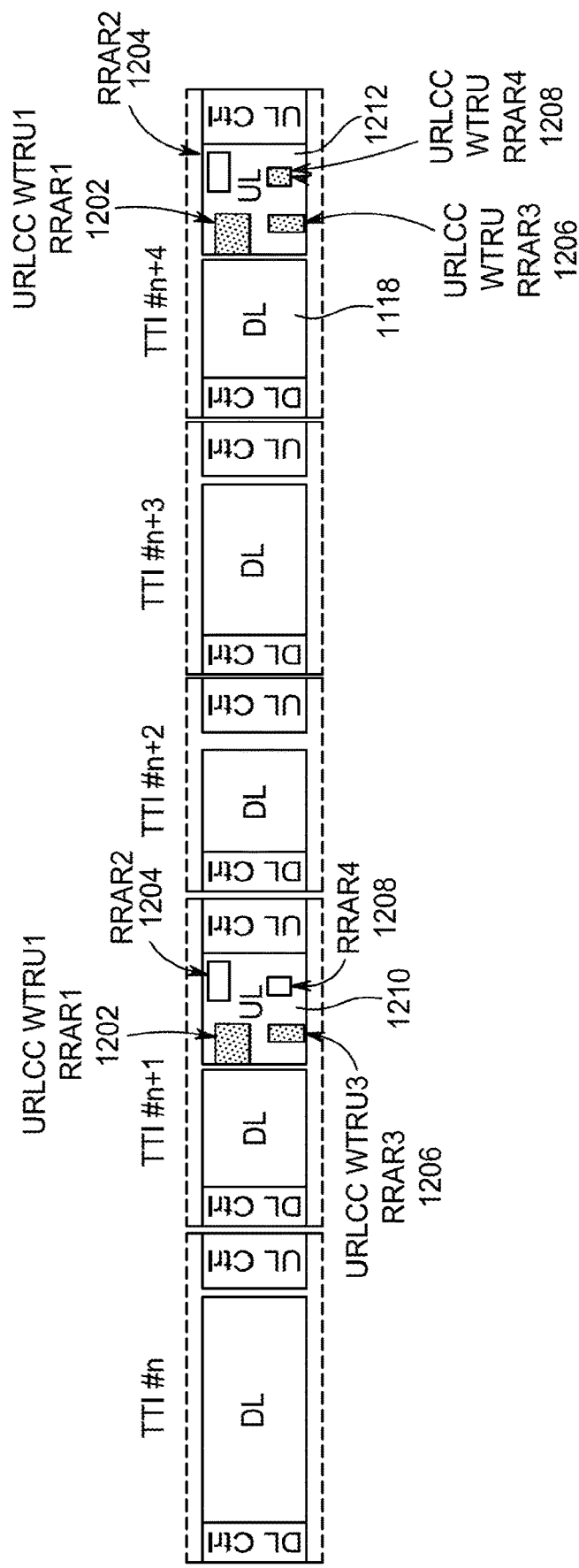
FIG. 12 is a diagram illustrating autonomous transmission for persistent allocations when scheduling multiple services using RRARs.

Referring now to FIG. 12, a diagram illustrating autonomous transmission for persistent allocations when scheduling multiple services using RRARs is shown. A first RRAR 1202, a second RRAR 1204, a third RRAR 1206, and a fourth RRAR 1208 may be configured and designated for an UL portion 1210 of TTI #n+1 and an UL portion 1212 of TTI #n+4. Each of the designated RRARs may correspond to a first WTRU, a second WTRU, a third WTRU, and a fourth WTRU.

In the UL portion 1210 of TTI #n+1, a first WTRU and a third WTRU have data to transmit, so transmissions take place in their allowed and designated RRARs while the second WTRU and the fourth WTRU do not transmit. In the UL portion 1212 of TTI #n+4, the first WTRU, the third WTRU, and the fourth WTRU have data to transmit, so transmission take place in their corresponding RRARs. The second RRAR 1204 nay be unused. The eNB may detect the presence or absence of a data transmission from the WTRUs for each of the designated RRARs in the TTIs where RRARs where configured and valid (i.e. in the UL portion 1210 of TTI #n+1 and the UL portion 1212 of #n+4). The eNB may use blind detection based on received power or energy received on pilot and/or data symbols corresponding to the RRARs to detect the presence or absence of data. Because a particular RRAR transmission may occur over a well identified and designated time/frequency region, blind estimation using energy detection may be implemented in a receiving device.

Blind decoding may be used on sub-resources of a slot. For example, a WTRU may attempt decoding control information and/or data in a set of at least one RRAR of a slot (e.g., downlink or receive sidelink) according to at least one configured candidate set of transmission parameters. The WTRU may make a determination of whether control information and/or data intended for the WTRU is present in a first RRAR. The WTRU may transmit applicable HARQ feedback in a second RRAR (e.g., uplink or transmit sidelink) on the condition that such control information and/or data is determined to be present in the first RRAR.

This process may reduce the scheduling delay by an order of one or more OFDM symbols compared to the duration of a whole slot. The network may indicate a set of RRARs to the WTRU in control information at the beginning of a slot even if no data is available for the WTRU at that time. The network may subsequently transmit data (e.g., URLLC data) that may become available after transmission of the control information for the slot. The set of RRARs may have starting OFDM symbols that span the whole slot to minimize the maximum possible scheduling delay.

As described in additional detail below, the WTRU may be involved in the determination of a set of RRARs in a slot, the determination of candidate sets of transmission parameters, the determination of the presence of control information and/or data for the WTRU, and the determination of subsequent transmissions that may be performed by the WTRU.

There may be one RRAR for each symbol of the slot that is used as a starting symbol. This may include every symbol, every other symbol, or every symbol at a mini-slot boundary.

Each RRAR may be configured with a certain duration and a certain PRB range. The same duration and PRB range may be used for all slots. The configuration for a given set of RRAR may be provided by RRC signaling. Multiple such sets of RRARs may be configured by RRC for added flexibility. The applicable set, or sets, of RRAR may be indicated by a field of the DCI at the beginning of the slot. The WTRU may be configured to use a default set of RRAR in a slot if no applicable DCI was received to indicate a set for the slot. This approach may provide a very low scheduling delay without requiring transmission of DCI in every slot when there is little or no activity for the WTRU.

A set of transmission parameters may include but is not limited to any information required to successfully decode data and/or control information in an RRAR. For example, the information may include one or more of a modulation and coding scheme (MCS), a transport block size, a code (or information) block size, an indication of a reference signal (including its location within an RRAR) or beam, a CRC length, and an identity parameter.

When one or more of data and control information is present, the information may be specific to the data, the control information, or it may be common for both. The information may also include an indication of the resource within an RRAR where control information and/or data may be present. The information may also indicate if control information and/or data is not present. For example, the information for a first set of RRARs may indicate that both data and control information are present. The information may indicate that control information is included in the first M symbols and the highest N PRBs of the RRAR and that data is included in the remaining resource elements of the RRAR. The information for a second set of RRARs may indicate that only data or that only control information is present and included in all resource elements of the RRAR. If a transmission is mapped to more than one RRAR, the information may also include a number or set of RRARs.

The WTRU may attempt decoding assuming one or more candidate sets of transmission parameters. The candidate sets applicable to a given slot, or to a given RRAR in a slot, may be obtained from physical layer, MAC, RRC signaling, or a combination thereof. For example, DCI may indicate the value of one transmission parameter applicable to at least one candidate set, such as an MCS for data, while other parameters may be configured by RRC signaling. In another example, a field of DCI may indicate a subset of the candidate sets configured by RRC. The WTRU may be configured with a default candidate set of transmission parameters that is applicable in any slot, possibly only when no applicable DCI was received for the candidate sets of transmission parameters for the RRARs of this slot.

When the WTRU successfully detects control information for an RRAR, it may apply transmission parameters indicated in this control information when attempting decoding data in the same RRAR or in a subsequent RRAR.

The WTRU may make a determination of whether control information and/or data was received in an RRAR or set of RRARs. For example, the WTRU may determine that control information and/or data was present if, following demodulation and decoding of control information and/or data based on a candidate set of transmission parameters, a CRC (possibly masked with an identity parameter) applied to the control information or to the data indicates successful decoding. If a first CRC indicates successful detection for control information, but a second CRC indicates failed detection for data, the WTRU may determine that data intended for the WTRU was present but not successfully decoded and that a retransmission may be required.

The WTRU may also determine that control information and/or data was received in an RRAR if a reference signal is detected above a threshold in terms of received power or signal-to-noise ratio.

The WTRU may use a lightweight HARQ operation. For example, the WTRU may generate an ACK when data is successfully decoded in an RRAR and may transmit the ACK in a subsequent UL resource or RRAR. Such transmissions may only be performed for a configured subset of RRARs.

The WTRU may generate a NACK when data is not successfully decoded in an RRAR and may transmit the NACK in a subsequent UL resource or RRAR. The NACK may be generated when the WTRU determines that control information and/or data was received in an RRAR. The WTRU may generate and transmit ACK or NACK if indicated to do so in DCI applicable to the slot.

If the WTRU does not successfully decode data or control information for an RRAR, the WTRU may keep the received signal or demodulated soft symbols in a memory for a default HARQ entity and redundancy version associated with the RRAR. The association may be pre-defined (i.e., by order of RRAR in the slot) or signaled. The WTRU may do this if it determines that control information and/or data was received based on detection of a reference signal above a threshold. The WTRU may clear the information for a HARQ entity just before reception of an RRAR to which it is associated.

If the WTRU successfully decodes control information for an RRAR, but does not decode the data, the WTRU may combine the demodulated soft symbols for the data portion of the RRAR with symbols already stored in the HARQ entity indicated by the control information. This may override the default HARQ entity associated with this RRAR. Alternatively, the WTRU may combine the demodulated soft symbols for the data portion of the RRAR with symbols already stored in the HARQ entity associated with the RRAR when it contains control information based on a pre-determined rule.

The control information may indicate that a second subsequent RRAR contains data for the WTRU that is associated with an indicated HARQ entity. In this case, the WTRU may soft-combine the symbols of the second RRAR with symbols already stored in the indicated HARQ entity. The control information may also indicate a redundancy version for the retransmission. Alternatively, the redundancy version may be determined from a fixed association with an RRAR.

This process may enable a low-overhead URLLC operation where control information in RRARs is only transmitted when there is a need for a retransmission. For example, the WTRU may attempt to decode every RRAR according to two candidate sets of transmissions, one corresponding to data only and the second corresponding to control information or a combination of control information and data. If the WTRU does not successfully decode according to either candidate set, the HARQ entity associated with the RRAR may be cleared and demodulated symbols from the RRAR may be stored for the HARQ entity. IF the WTRU successfully decodes only the data, an ACK may be transmitted. If the WTRU successfully decodes the control information, data indicated by the control information (possibly of the same RRAR) may be combined to the indicated HARQ entity. An ACK or NACK may be transmitted depending on the outcome.

When the WTRU transmits NACK or ACK, the transmission may take place in a UL RRAR resource determined according one or more of the following parameters. The UL RRAR resource may be determined based on an association with the DL RRAR for which NACK or ACK is reported. The association may be based on a pre-determined rule and/or may be configured by higher layers. For example, the UL RRAR may occur a fixed number of symbols after the associated DL RRAR and may occupy a configured set of PRBS, which may be different for each UL RRAR. The configuration of PRBs for the UL RRAR may be provided along with the configuration of PRBs for the corresponding DL RRAR for each set of RRARs configured by higher layers. The UL RRAR resource may be indicated as part of control information decoded in the DL RRAR. If only an ACK is to be transmitted, the control information may be jointly encoded with the data (i.e., in-band signaling).

Data scheduled within a TTI or slot may belong to more than one group of transport blocks that are allocated to distinct physical resources (e.g., time and/or frequency) within the TTI or slot.

The allocation of transport blocks may be controlled to maximize the amount of data that can be successfully transmitted in case preemption by higher priority traffic in certain physical resources occurs. For example, the allocation of transport blocks may be such that physical resources that cannot be, or are less likely to be, preempted by higher priority traffic are used for a first group of transport blocks, while physical resources that can potentially be, or are more likely to be, preempted by higher priority traffic are used for at least a second group of transport blocks.

A group of transport blocks may include a transmission or retransmission of a single transport block, or a set of two or more transmitted or retransmitted transport blocks multiplexed in the spatial domain that are allocated to the same time/frequency resources. If the transmission/retransmission of a portion of a transport block is supported, the transport block may include either a complete transport block or of a subset of codeblocks associated with the transport block. The allocation of groups of transport blocks to resources may be efficiently indicated by configured RRARs in the downlink control information. Higher priority traffic may include control and/or data information, which may be for a different WTRU.

If preemption does occur in certain resources of the TTI, such as the RRARs, the transmission of only the groups of transport blocks allocated to these resources may be affected. This may reduce the waste of resources as compared to a method where a single group of transport blocks is allocated to the whole TTI. In the latter case, all the data scheduled in the TTI would need to be retransmitted.

An additional amount of HARQ feedback may be required to support the allocation of groups of transport blocks, but this may be kept to a minimum by a suitable allocation of resources to each group of transport blocks. For example, if preemption can only occur in a small fraction of the physical resources available to the TTI, a single group of transport blocks may be allocated to the rest of the physical resources.

Figure 13:
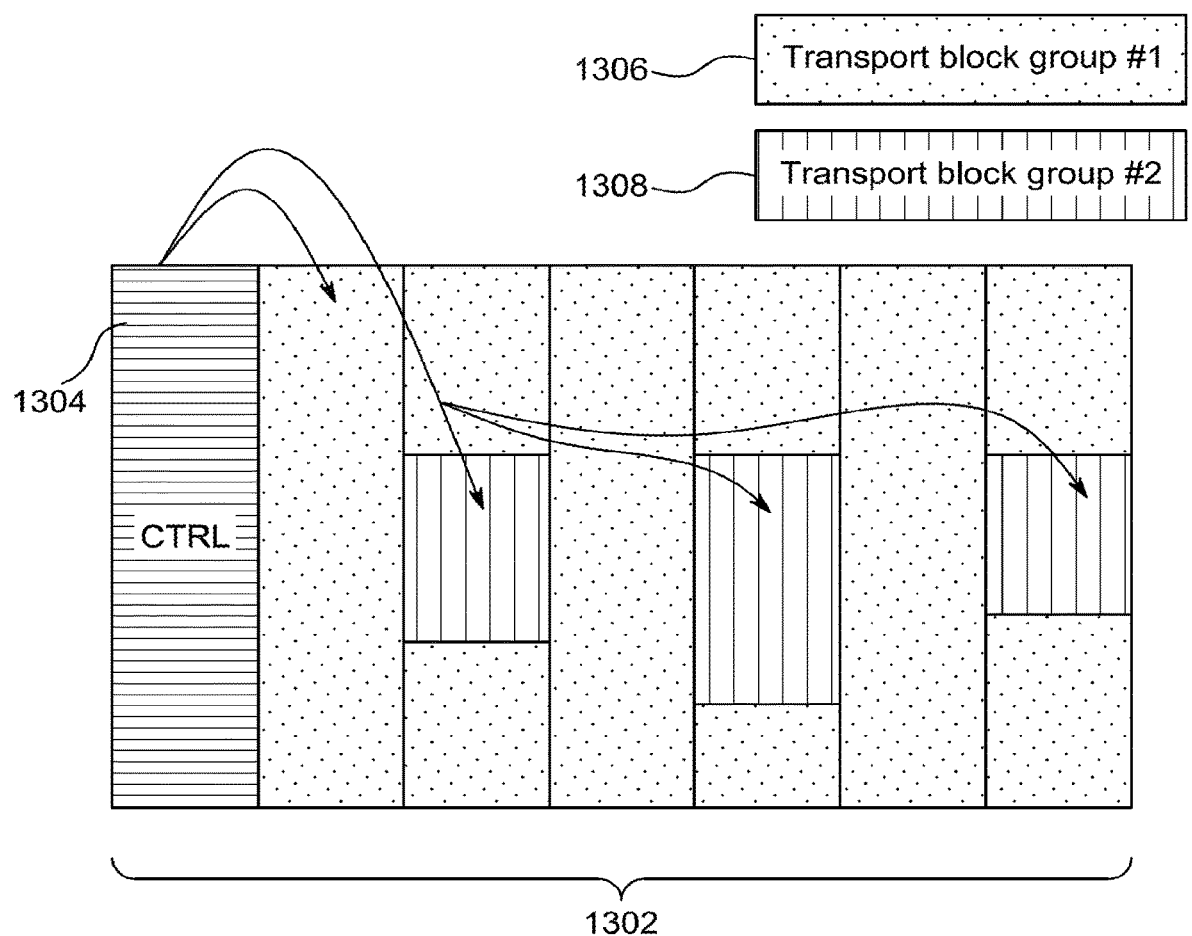
FIG. 13 is a diagram illustrating an example of the shaping of transport block allocations.

Referring now to FIG. 13, a diagram illustrating a first example of the shaping of transport block allocations is shown. FIG. 13 illustrates a downlink case, but the allocations may also be applicable to an uplink or sidelink case. As shown, a TTI 1302 may span 7 OFDM symbols. Control information may be provided in a first OFDM symbol 1304 and data may be provided in subsequent symbols. The control information may indicate that a first group of transport blocks 1306 is allocated to first physical resources, while a second group of transport blocks 1308 is allocated to second physical resources. The second resources may potentially be preempted by high priority traffic. It should be noted that the scheduler may not know whether preemption will occur when the control information is determined. The second resources may correspond to configured RRARs.

If preemption does not occur, all transport blocks may be successfully decoded, assuming enough energy was accumulated. On the other hand, if preemption does occur on a portion or all of the second resources in the second group of transport blocks 1308, the first group of transport blocks 1306 may still be successfully decoded even if the second group of transport blocks are not. The scheduler may retransmit the second group of transport blocks 1308 in a subsequent TTI, and may toggle the associated new data indicator to prevent buffer corruption.

Figure 14:
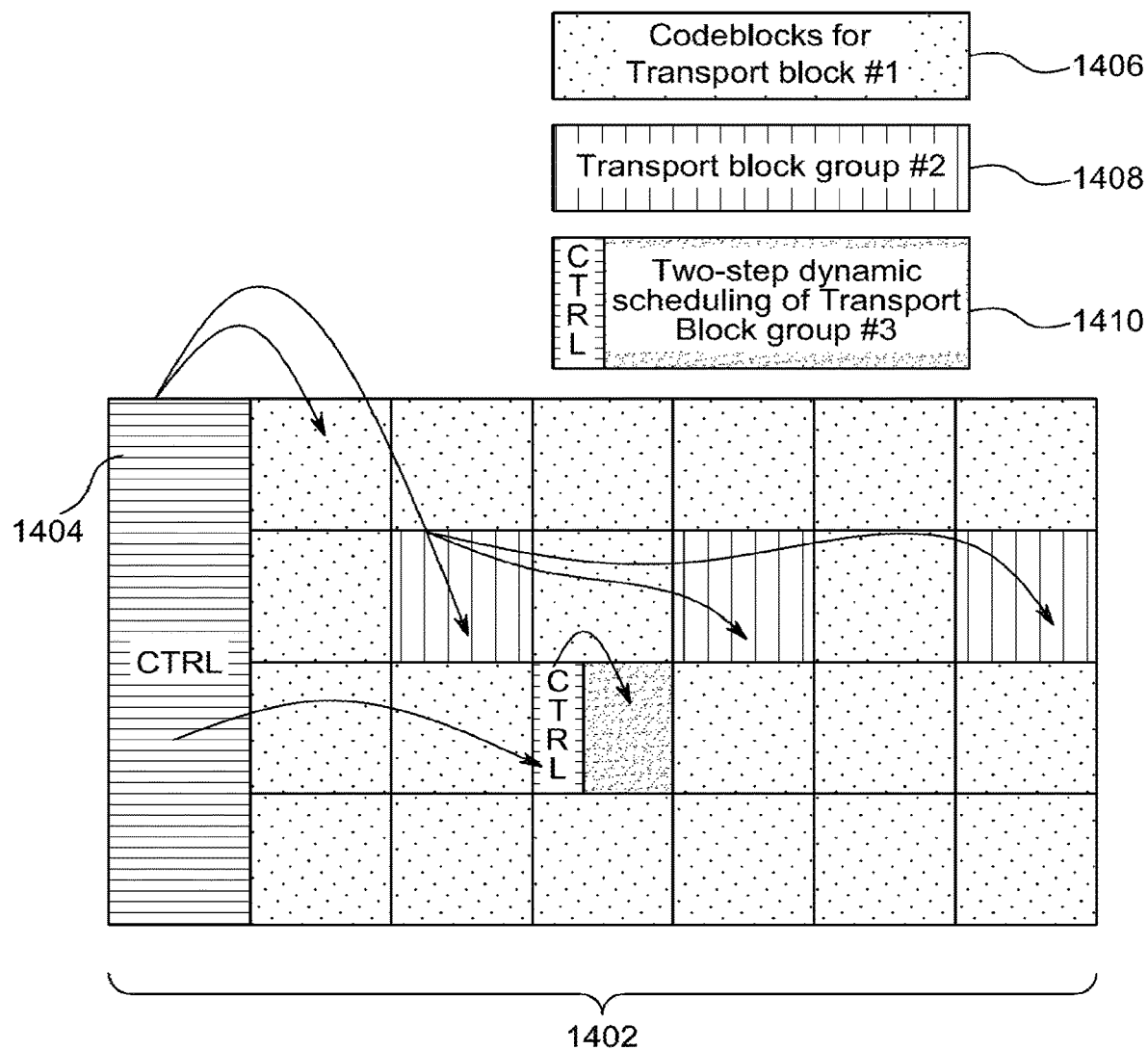
FIG. 14 is a diagram illustrating another example of shaping of transport block allocations.

Referring now to FIG. 14, a diagram illustrating another example of shaping of transport block allocations is shown. FIG. 14 shows a case where partial transmission of a transport block is supported. As shown, a TTI 1402 may span 7 OFDM symbols. Control information may be provided in a first OFDM symbol 1404. Data and additional control information may be provided in subsequent symbols. In this example, a first set of resources are allocated to the transmission of a subset of codeblocks of a first transport block group 1406. A second set of resources are allocated to a second transport block group 1408 and a third set of resources are allocated to a third transport block group 1410. The third set of resources may contain additional control information 1412 that may be used for the decoding of the third transport block group 1410.

The resources allocated to a given group of transport blocks in the downlink, uplink, or sidelink may be indicated by one or more methods. A WTRU may determine the applicable physical resource allocation for the transmission of a group of transport blocks as a function of multiplexing information. This information may be determined based on control signaling information.

A WTRU may determine applicable resources using a set of one or more transmission resources that overlap, at least partially in time and/or frequency, with another resource of the same set. The set of one or more transmission resources may operate at different scheduling granularity. In one example, the set of one or more transmission resources may correspond to one or more resources, if disjoint in time/frequency, associated with a transport block and/or with a HARQ process. In another example, the set of one or more transmission resources may correspond to one or more resources, if disjoint in time/frequency, associated with one or more codeblocks (e.g., when codeblock-based HARQ is applicable to the applicable transport blocks and/or HARQ process).

In another example, more than one type of granularity may be used concurrently. For example, codeblock-based granularity (e.g., for an eMBB transmission) and transport block/HARQ-based granularity (e.g., for a URLLC transmission) may be used, and may be aligned in terms of an overlapping of their respective resources. The WTRU may then compute mutually exclusive physical resources for each transmission at the applicable granularity based on the determined multiplexing information. The WTRU may determine the multiplexing information from a semi-static configuration, dynamically, or using a combination of both.

The WTRU may determine first physical resources for a first group of transport blocks, for example, based on semi-static configuration. The first group of transport blocks may be RRAR. The WTRU may then determine second physical resources for a second group of transport blocks from a field of DCI. A portion of a second physical resource may not overlap with the physical resources allocated to the first group of transport blocks. For example, the second physical resources may include a set of resource blocks in the frequency domain indicated by a frequency allocation field and a set of time symbols spanning the duration of the TTI. Resources used for transmission of control information may be excluded. The duration of a TTI may be one or more slots, and may be indicated by a field of DCI.

The first physical resources and/or the second physical resources may include a set of antenna ports. The WTRU may exclude time/frequency resources for one group of transport blocks if the time/frequency resources are allocated to a second group of transport blocks for the same set of antenna ports. Alternatively, the exclusion may apply regardless of the set of antenna ports used for the transmission of each group of transport blocks.

The WTRU may have a semi-static configuration of an RRAR, including a set of first resources for a transport block that corresponds to $x_1$ symbols over $y_1$ subcarriers. The WTRU may receive dynamic control signaling (e.g., a DCI) that schedules a large transport block over a second set of resources that corresponds to $x_2$ symbols over $y_2$ subcarriers. The first set of resources ($x_1$, $y_1$) may be a subset of the second set of resources ($x_2$, $y_2$).

If the WTRU determines that the configuration of the first set of resources is activated and/or if the DCI includes an indication that the first set of resources is applicable for the scheduled time interval (e.g., slot, subframe, or the like), the WTRU may determine that a first transmission (e.g. a first transport block, or a retransmission thereof) is expected in the first set of resources while a second transmission (e.g., a second transport block, a set of codeblocks of a second transport block, or a retransmission thereof) is expected in the second set of resources, excluding the portion corresponding to ($x_1$, $y_1$). Otherwise, the WTRU may determine that a transmission is expected in the explicitly indicated resources, such as ($x_2$, $y_2$). This may be generalized to more than two sets of resources.

This technique may enable a high level of scheduling flexibility for multiplexing different transmissions, such as user plane or control plane data on a physical data channel and/or downlink/uplink control signaling on a physical control channel for the same WTRU or for different WTRUs. The granularity may be controlled and configured by the network. For example, the network may configure a WTRU with a codeblock-based approach for HARQ (e.g., for eMBB services). The network may further configure URLLC transmissions with resources, whereby the URLLC transport block can match the granularity of a codeblock used for an eMBB transport block. This approach may increase robustness to puncturing and may minimize retransmission overhead when the puncturing of eMBB transmissions occur (e.g., when codeblock-based feedback and/or retransmissions are supported in the system). This may be further generalized to any transmission that differs in transmission time duration and/or in transmission bandwidth.

Transmission parameters for each group of transport blocks may be indicated to the WTRU. Transmission parameters may include at least a MCS for each transport block of a group of transport blocks and a set of antenna ports and/or beam process for reception or transmission. At least one of the parameters may be common to more than one group of transport blocks. For example, if each group includes two transport blocks, the two MCS values applicable to a first group may be applicable to the second group as well. Alternatively, different sets of values may be signaled independently for each group of transport blocks.

Each group of transport blocks may be associated with a separate HARQ process. The identity of the HARQ process may be explicitly indicated (e.g., from a field of DCI) for at least one group of transport blocks. The identity of the HARQ process may be determined implicitly for at least one group of transport blocks. For example, a HARQ process identity may be configured by higher layers for each RRAR. The WTRU may then determine the HARQ process identity for a transport block group based on the identity of the RRAR indicated by DCI.

A WTRU may determine at least one of a new data indicator (NDI), a retransmission sequence number, and a redundancy version (RV) for each transport block. At least one of these values may be explicitly indicated from DCI. Certain values, such as the RV, may be determined implicitly for at least one group of transport blocks in a manner similar to the HARQ process identity as described above.

Multiple disjoint physical resources (e.g. RRARs) may be configured within the TTI and may be allocated for the transmission of specific redundancy versions of the same transport block. For example, RRARs may be configured in the third, fifth, and seventh symbol of a slot for a group of transport blocks. The third symbol may be used for transmitting a first redundancy version of each transport block of the group. The fifth symbol may be used for transmitting a second redundancy version of each transport block of the group. The seventh symbol may be used for transmitting a third redundancy version of each transport block of the group. The redundancy version that may be used in each disjoint resource may be obtained from DCI or from a configured or pre-determined sequence.

A WTRU may be first configured by higher layers with a set of RRARs. The set may be defined as a set of time symbols within a slot (e.g., the fourth and sixth symbol) and a frequency allocation for each symbol. The frequency allocation may be defined relative to resources used for control signaling (e.g., a control resource set). The frequency allocation may be done separately for each time symbol.

The WTRU may monitor a control channel in a slot assuming a DCI format supporting operation with multiple groups of TBs. The DCI format may include one or more of the following fields.

The DCI format may include a frequency allocation field indicating the maximum amount of resources that may be allocated to a first group of transport blocks. The DCI format may include a field indicating the antenna ports associated with the transmissions. The DCI format may include a HARQ process identity field indicating the HARQ process applicable to the first group of transport blocks. The DCI format may include at least one MCS field indicating modulation and coding applicable to each transport block within a group. The DCI format may include at least one new data indicator field and redundancy version field applicable to each transport block for at least the first group of transport blocks.

The DCI format may include a transport block group indicator field. This field may take multiple possible values indicating whether one or multiple groups of transport blocks are transmitted and on which resource. This field may also include a new data indicator for a second group of transport blocks, and (if applicable) a type of transport channel for each group.

A first value of the field may indicate that a single group of transport blocks is transmitted in the TTI (or slot or set of slots), which may then be allocated the full resources indicated by the frequency allocation field over the TTI.

A second value of the field may indicate that two groups of transport blocks are transmitted in the TTI (or slot or set of slots). The first group may be allocated the resources indicated by the frequency allocation field, excluding the resources overlapping with the resources allocated to the second group. The second group may be allocated the resources of the configured set of RRARs.

A third value of the field may indicate that a single group of transport blocks is transmitted in the TTI (or slot or set of slots), but that this group is only allocated the resources indicated by the frequency allocation field, excluding the resources overlapping the configured set of RRARs. This value may be used, for example, if the scheduler knows that the RRARs will be allocated to another WTRU with high probability. In another example, the RRARs may correspond to a control resource set of subsequent slots for a multi-slot allocation. The scheduler may use this value to indicate that no data should be decoded from the resources of the control resource set of subsequent slots if it knows that the control resource set is likely to be used for scheduling another WTRU.

A fourth value of the field may indicate that two groups of transport blocks are transmitted in the TTI (or slot). In addition, this value may indicate that the new data indicator is toggled for both transport blocks of the second group. In this case, the WTRU may clear data stored in the corresponding HARQ entity before receiving the new data. This value may be used if preemption has occurred in a previous transmission, or after transport blocks of the second group have been received successfully. If new data indicators for the second group are provided separately, this value may not need to be defined.

The WTRU may determine that at least part of a transmission may be considered by the HARQ process to contain a pre-emption event. The WTRU may perform one or more actions to ensure that possible HARQ buffer corruption is avoided in case a pre-emption event occurs from a soft-combining process. The one or more actions may be referred to as HARQ buffer corruption avoidance. The WTRU may instantiate a second soft buffer for the concerned HARQ process to maintain the state of the soft buffer prior to the reception of the transmission for the concerned HARQ process while performing soft-combining with the transmission in a first soft buffer. The WTRU may subsequently determine which of the first or the second soft buffer to consider for the determination of the further HARQ processing (e.g. decoding of the transport blocks, generation of HARQ feedback associated with the current transmission) based on a determination of whether or not the entire transmission may be considered for the concerned transmission. For example, the WTRU may consider the second soft buffer for the further processing of a transport block and/or for generation of HARQ feedback if it determines that a pre-emption event has occurred for the concerned transmission possibly using portions of the transmission that are deemed valid and unlikely to be corrupted by the pre-emption event. Otherwise the first buffer may be used.

Implicit means may be used to determine that pre-emption has occurred. The WTRU may perform the determination of whether or not a pre-emption event has occurred implicitly. The determination may be based on one or more of the set of PRBs associated with a downlink transmission for the concerned HARQ process, from the identity of the concerned HARQ process, from an associated control channel, and from the timing of the transmission (e.g., such as a specific TTI within a range of TTIs). The means of determination may be a configuration aspect of the WTRU. The means of determination may be configured by one or more of a semi-static configuration of a range of addressable PRBs in frequency and/or in time, a semi-static configuration of the HARQ entity with one or more process IDs supporting such determination, a configuration associated with a control channel indicating that such a determination is supported, and a semi-static configuration of one or more TTIs within a range of TTIs.

Explicit means may be used to determine that pre-emption has occurred. The WTRU may perform the determination of whether or not a pre-emption event has occurred explicitly, such as based on reception of DCI. The DCI may indicate that handling for pre-emption may be performed by the WTRU for a transmission for the concerned HARQ process. The determination may be made according to any of the methods described herein or according to a combination of any of the methods described herein.

For a given HARQ process, a WTRU may determine whether or not it may perform HARQ buffer corruption avoidance on a per transmission basis and/or for the lifetime of the HARQ process (e.g., until the process is successful and/or until a HARQ ACK is generated). The WTRU may make the determination of HARQ buffer corruption at one or more points. The WTRU may make the determination when it determines that a new HARQ process is started, when it determines that an initial HARQ transmission is received, when it determines that the NDI has been toggled, and/or when it determines that a transmission is for a new transport block (or multiple thereof if supported by a same HARQ process). The WTRU may determine that a HARQ process is becoming active for the transmission of a new transport block (or for multiple transport blocks if supported within the same HARQ process) if, for example, the NDI is toggled for a HARQ process.

The determination for the handling of HARQ buffer corruption avoidance for a given HARQ process may be performed in combination with one or more of the above implicit or explicit indications when they are determined from the initial transmission of the HARQ process. For example, the WTRU may determine that the NDI has been toggled for a HARQ process, and it may determine that the initial transmission corresponds to a set of PRBs configured for the handling of pre-emption events. In such a case, the WTRU may determine that the HARQ process should be instantiated and/or adjusted to support HARQ buffer corruption avoidance at least for one retransmission for this HARQ process, and/or for all retransmissions associated with the transport blocks of the initial transmission. The determination may be made according to any of the methods described herein or according to a combination of any of the methods described herein.

From the perspective of the network, the above methods may enable statistical multiplexing of transmissions for different types of HARQ processes between multiple WTRUs. Sufficient opportunities may be generated to perform pre-emption using physical resources associated with a HARQ process that is known and/or expected to have HARQ buffer corruption currently active. The scheduler may thereby ensure that WTRUs do not exceed their HARQ capabilities, even without any WTRU implementation of over-provisioning memory space for HARQ buffering and HARQ decoding. For example, WTRUs operating at very high HARQ occupancy may be scheduled such that HARQ buffer corruption avoidance is not indicated, mandated, or expected during such a period of scheduling activity. The burden of supporting HARQ buffer corruption avoidance for one, some, or few HARQ processes may be spread across other WTRUs having a lower occupancy. Alternatively, this may be performed based on the capabilities of the WTRU if applicable and with considerations for WTRUs that may have specific provisions enabling full occupancy and HARQ buffer avoidance concurrently.

Corruption of data and HARQ retransmissions may be avoided while enabling a scheduler in a loaded cell to perform pre-emption transmissions when code block-based transmissions are used. From the WTRU perspective, one benefit is that WTRUs may support HARQ buffer corruption avoidance without having to over-dimension their HARQ processing and memory capabilities.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising a processor and memory, the processor and memory configured to:
   receive a radio resource control (RRC) message, the RRC message comprising configuration information defining a plurality of downlink resource regions;
   receive a first downlink control information (DCI), the first DCI comprising an indication of downlink resources allocated to the WTRU;
   receive a downlink transmission via the downlink resources;
   receive a second DCI subsequent to receiving the downlink transmission, the second DCI indicating that a subset of the downlink resources associated with the downlink transmission indicated by the first DCI was preempted, wherein the second DCI indicates that the subset of the downlink resources was preempted by referencing at least one of the downlink resource regions of the plurality of downlink resource regions defined by the configuration information comprised in the RRC message; and
   attempt to decode the downlink transmission based on the first and second DCI.

2. The WTRU of claim 1, wherein the first DCI is received in a first physical downlink control channel transmission, wherein the second DCI is received in a second physical downlink control channel transmission.

3. The WTRU of claim 1, wherein the plurality of downlink resource regions corresponds to downlink symbols.

4. The WTRU of claim 1, wherein the second DCI is common to a plurality of WTRUs.

5. The WTRU of claim 1, wherein the processor and memory are further configured to receive a signal after reception of the downlink transmission, wherein the signal comprises information about how to decode the downlink transmission, and wherein the configuration information further comprises information about how to dynamically configure the plurality of downlink resource regions for preemption of the subset of the downlink resources associated with the downlink transmission.

6. The WTRU of claim 1, wherein the plurality of downlink resource regions comprise a plurality of radio resource allocation regions (RRARs), and wherein referencing the downlink resource regions comprises referencing at least one RRAR of the plurality of RRARs, and wherein the processor is further configured to use the RRARs to dynamically allocate time and frequency radio resources associated for preemption of the downlink transmission.

7. A wireless transmit/receive unit (WTRU) comprising a processor and memory, the processor and memory configured to:
receive a radio resource control (RRC) message, the RRC message comprising configuration information defining a plurality of downlink resource regions;
receive a first downlink control information (DCI), the first DCI comprising an indication of downlink resources allocated to the WTRU;
receive a downlink transmission via the downlink resources;
receive a second DCI subsequent to receiving the downlink transmission, the second DCI indicating that a subset of the downlink resources associated with the downlink transmission indicated by the first DCI do not include downlink data for the WTRU by referencing at least one of the downlink resource regions of the plurality of downlink resource regions defined by the configuration information comprised in the RRC message; and
attempt to decode the downlink transmission.

8. The WTRU of claim 7, wherein the subset of the downlink resources corresponds to one or more symbols.

9. The WTRU of claim 8, wherein the processor and memory are configured to discard data received via the downlink resources in the one or more symbols.

10. The WTRU of claim 7, wherein the second DCI corresponds to a preemption indicator.

11. The WTRU of claim 7, wherein the first DCI is received in a first physical downlink control channel transmission, wherein the second DCI is received in a second physical downlink control channel transmission.

12. The WTRU of claim 7, wherein the processor and memory are further configured to receive a signal after reception of the downlink transmission, wherein the signal comprises information about how to decode the downlink transmission, and wherein the configuration information further comprises information about how to dynamically configure the plurality of downlink resource regions for preemption of the subset of the downlink resources associated with the downlink transmission.

13. The WTRU of claim 7, wherein the plurality of downlink resource regions comprise a plurality of radio resource allocation regions (RRARs), and wherein referencing the downlink resource regions comprises referencing at least one RRAR of the plurality of RRARs, and wherein the processor is further configured to use the RRARs to dynamically allocate time and frequency radio resources associated for preemption of the downlink transmission.

14. A method implemented by a wireless transmit/receive unit (WTRU), the method comprising:
receiving a radio resource control (RRC) message, the RRC message comprising configuration information defining a plurality of downlink resource regions;
receiving a first downlink control information (DCI), the first DCI comprising an indication of downlink resources allocated to the WTRU;
receiving a downlink transmission via the downlink resources;
receiving a second DCI subsequent to receiving the downlink transmission, the second DCI indicating that a subset of the downlink resources associated with the downlink transmission indicated by the first DCI does not include downlink data for the WTRU, and wherein the second DCI indicates the subset of the downlink resources was preempted by referencing at least one of the downlink resource regions of the plurality of downlink resource regions defined by the configuration information comprised in the RRC message; and
attempting to decode the downlink transmission.

15. The method of claim 14, wherein the subset of the downlink resources corresponds to one or more symbols.

16. The method of claim 15, further comprising discarding data received via the downlink resources in the one or more symbols.

17. The method of claim 14, wherein the second DCI corresponds to a preemption indicator.

18. The method of claim 14, wherein the first DCI is received in a first physical downlink control channel transmission, wherein the second DCI is received in a second physical downlink control channel transmission.

19. The method of claim 15, wherein the second DCI is common to a plurality of WTRUs.

20. The method of claim 14, wherein the method further comprises receiving a signal after reception of the downlink transmission, wherein the signal comprises information about how to decode the downlink transmission, and wherein the configuration information further comprises information about how to dynamically configure the plurality of downlink resource regions for preemption of the subset of the downlink resources associated with the downlink transmission.

21. The method of claim 14, wherein the plurality of downlink resource regions comprise a plurality of radio resource allocation regions (RRARs), and wherein referencing the downlink resource regions comprises referencing at least one RRAR of the plurality of RRARs, and wherein the method further comprising using the RRARs to dynamically allocate time and frequency radio resources associated for preemption of the downlink transmission.

* * * * *